(12) United States Patent
Faust et al.

(10) Patent No.: US 12,717,602 B1
(45) Date of Patent: Aug. 25, 2026

(54) CREDITLESS PERFORMANCE BURSTING IN MULTI-TENANT ENVIRONMENTS

(71) Applicant: Amazon Technologies, Inc., Seattle, WA (US)

(72) Inventors: Ethan John Faust, Seattle, WA (US); Mykhailo Karataiev, Redmond, WA (US); Yuxuan Liu, Bellevue, WA (US); Chris Truter, Cape Town (ZA); Cristian Rossi, Cape Town (ZA); Jacobus Adriaan Krynauw, Cape Town (ZA); Hans-Gerhard Hesse, Arlington, VA (US); Philip Charles Anderson, Seattle, WA (US); Cicerone Cojocaru, Seattle, WA (US); Frances Katherine Pierce, North Vancouver (CA); Alexandra Juliet Brasch, Seattle, WA (US); John David Dunagan, Redmond, WA (US); Anton Valter, Renton, WA (US); Saurabh Nirmal Modh, San Jose, CA (US); Alexander Gregory Bestavros, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 796 days.

(21) Appl. No.: 17/855,456

(22) Filed: Jun. 30, 2022

(51) Int. Cl.
*G06F 9/455* (2018.01)

(52) U.S. Cl.
CPC ...... *G06F 9/45558* (2013.01); *G06F 9/45545* (2013.01); *G06F 2009/4557* (2013.01)

(58) Field of Classification Search
CPC ............. G06F 9/45558; G06F 9/45545; G06F 2009/4557
See application file for complete search history.

(56) References Cited

U.S. PATENT DOCUMENTS 10,728,169 B1 * 7/2020 McClenahan ......... H04L 41/082
10,884,778 B1 * 1/2021 Dunagan ............ G06F 9/45558
(Continued)

OTHER PUBLICATIONS

Cheng Wang, Using Burstable Instances in the Public Cloud: Why, When and How?, ACM Jun. 2017 (Year: 2017).*
(Continued)

*Primary Examiner* — Dong U Kim
(74) *Attorney, Agent, or Firm* — Nicholson De Vos Webster & Elliott LLP

(57) ABSTRACT

Techniques for managing cloud computing resources hosting burstable performance instances are described. A host computer system of a cloud provider network executes a first burstable performance compute instance having an associated first baseline compute performance level, the first burstable performance compute instance able to use at least a portion of a compute capacity headroom to exceed the first baseline compute performance level. A total baseline compute performance level of a plurality of burstable performance compute instances hosted by the host computer system is calculated. A difference between a compute resource utilization of the host computer system and the total baseline compute performance level is determined to be below a threshold. A status identifier associated with a portion of compute capacity of the host computer system is updated to reserve the portion of compute capacity of the host computer system to contribute to the compute capacity headroom.

20 Claims, 15 Drawing Sheets

(56) References Cited

U.S. PATENT DOCUMENTS

| | | | | |
|---|---|---|---|---|
| 2015/0334040 | A1* | 11/2015 | Crowell | H04L 12/6418 709/226 |
| 2016/0164797 | A1* | 6/2016 | Reque | G06F 9/5077 718/1 |
| 2016/0299693 | A1* | 10/2016 | Sakdeo | G06F 11/3409 |
| 2019/0324812 | A1* | 10/2019 | Kusters | G06F 9/50 |
| 2020/0092222 | A1* | 3/2020 | McClenahan | G06F 9/45558 |
| 2021/0109855 | A1* | 4/2021 | Watt | G06F 12/0253 |
| 2021/0141655 | A1* | 5/2021 | Gamage | G06F 9/45545 |
| 2022/0276905 | A1* | 9/2022 | Manousakis | G06F 11/3006 |

OTHER PUBLICATIONS

Notice of Allowance, U.S. Appl. No. 17/855,374, Apr. 1, 2025, 5 pages.

* cited by examiner

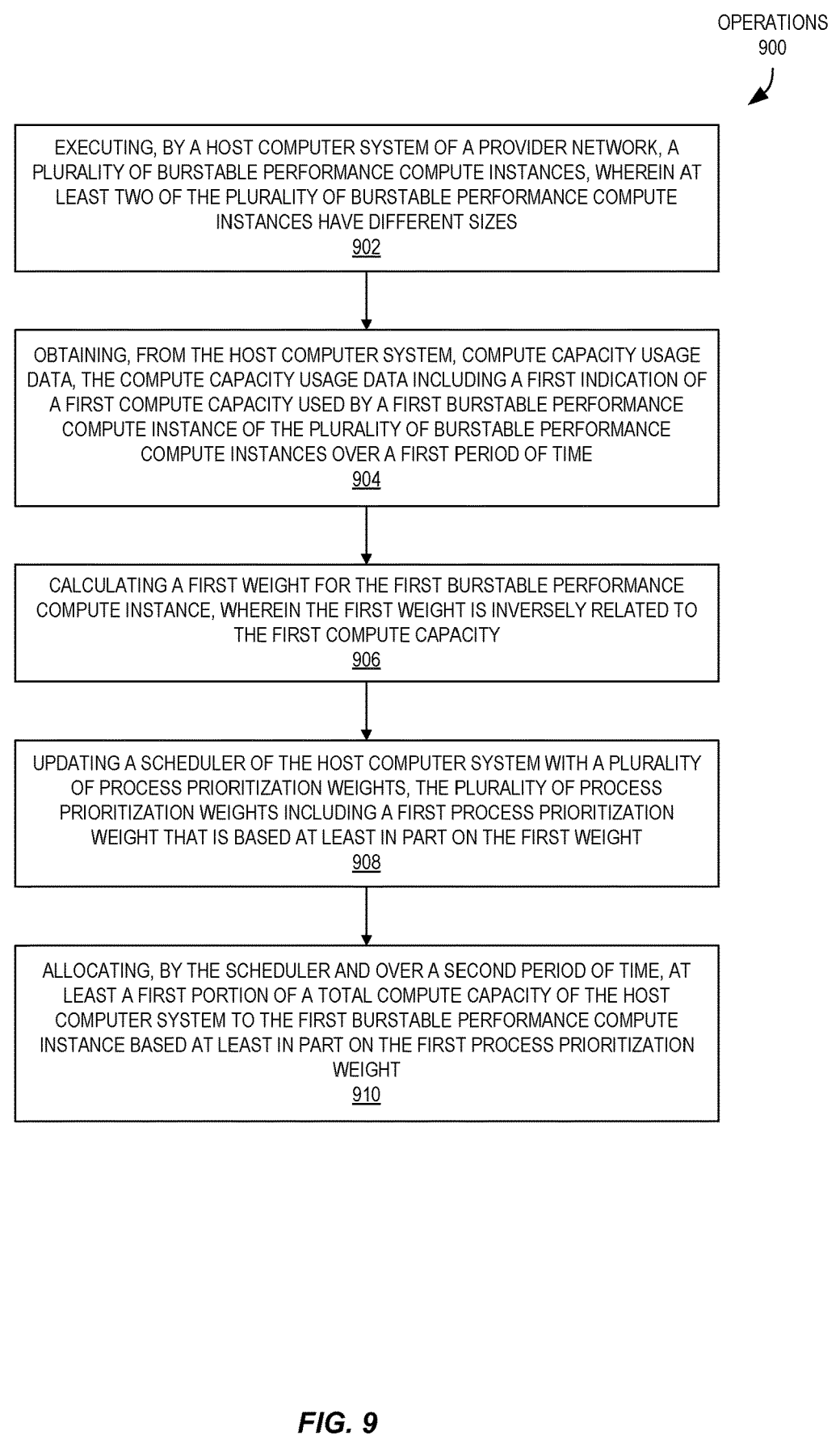

OPERATIONS
900

EXECUTING, BY A HOST COMPUTER SYSTEM OF A PROVIDER NETWORK, A PLURALITY OF BURSTABLE PERFORMANCE COMPUTE INSTANCES, WHEREIN AT LEAST TWO OF THE PLURALITY OF BURSTABLE PERFORMANCE COMPUTE INSTANCES HAVE DIFFERENT SIZES
902

OBTAINING, FROM THE HOST COMPUTER SYSTEM, COMPUTE CAPACITY USAGE DATA, THE COMPUTE CAPACITY USAGE DATA INCLUDING A FIRST INDICATION OF A FIRST COMPUTE CAPACITY USED BY A FIRST BURSTABLE PERFORMANCE COMPUTE INSTANCE OF THE PLURALITY OF BURSTABLE PERFORMANCE COMPUTE INSTANCES OVER A FIRST PERIOD OF TIME
904

CALCULATING A FIRST WEIGHT FOR THE FIRST BURSTABLE PERFORMANCE COMPUTE INSTANCE, WHEREIN THE FIRST WEIGHT IS INVERSELY RELATED TO THE FIRST COMPUTE CAPACITY
906

UPDATING A SCHEDULER OF THE HOST COMPUTER SYSTEM WITH A PLURALITY OF PROCESS PRIORITIZATION WEIGHTS, THE PLURALITY OF PROCESS PRIORITIZATION WEIGHTS INCLUDING A FIRST PROCESS PRIORITIZATION WEIGHT THAT IS BASED AT LEAST IN PART ON THE FIRST WEIGHT
908

ALLOCATING, BY THE SCHEDULER AND OVER A SECOND PERIOD OF TIME, AT LEAST A FIRST PORTION OF A TOTAL COMPUTE CAPACITY OF THE HOST COMPUTER SYSTEM TO THE FIRST BURSTABLE PERFORMANCE COMPUTE INSTANCE BASED AT LEAST IN PART ON THE FIRST PROCESS PRIORITIZATION WEIGHT
910

*FIG. 9*

CREDITLESS PERFORMANCE BURSTING IN MULTI-TENANT ENVIRONMENTS

BACKGROUND

Cloud computing environments often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various examples in accordance with the present disclosure will be described with reference to the following drawings.

FIG. 9 is a flow diagram illustrating operations of a method for burstable performance instance scheduling according to some examples.

DETAILED DESCRIPTION

Figure 1:
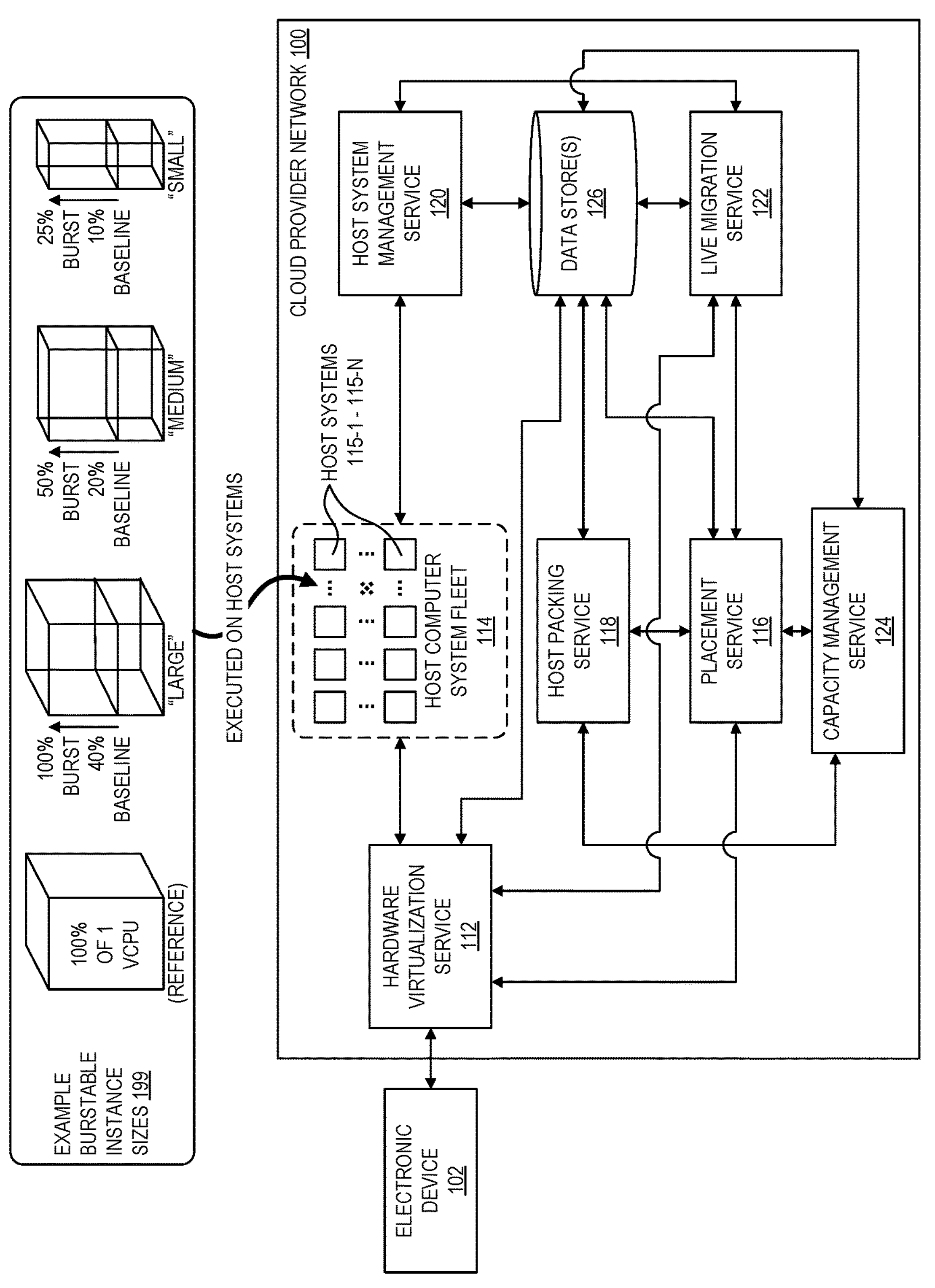
FIG. 1 is a diagram illustrating an environment for managing cloud computing resources with burstable performance instances according to some examples.

The present disclosure relates to methods, apparatus, systems, and non-transitory computer-readable storage media for burstable performance instances hosted on multi-tenant infrastructure, such as compute instances in a cloud computing environment. Burstable performance instances (or "burstable instances," sometimes referred to as burstable virtual machines (VMs) or shared-core VMs) are an instance type that has a dynamic resource footprint on the underlying hardware resources of a host computer system. Traditional compute instances are allocated a fixed portion of an underlying host computer system's resources. The compute instance may or may not use its entire resource allocation, often resulting in host systems being underutilized. Underutilization in turn causes economic and environmental inefficiencies due to the cost of maintaining underused or idle capacity. While some other compute instances may be able to burst, such bursting is traditionally contingent on the availability of "credits" for that instance, which may be accumulated over time by operating at or below baseline, or which may be purchased, for example. The burstable instances enabled by the present disclosure are "creditless" by way of one or more techniques including intelligent placement of sets of burstable instance on the same host (with or without slots reserved for burst capacity) by proactive modeling resource usage, continuous/periodic adjustment of resource scheduler policies on hosts to ensure fairness of resource scheduling across instances, load balancing instances across host systems with live migration based on historical resource usage, and intelligent capacity management across hosts to incrementally optimize layout of instances. This creditless bursting can provide an improved customer experience, as the customer can obtain the benefits of a burstable instance type without having to manage (and potentially exhaust) bursting credits.

Customer workloads rarely use a constant level of resources (e.g., compute, memory, etc.) over their lifetime. Instead, workloads often have varying degrees of resource usage over time. For example, rather than have a fixed compute capacity allocation, burstable instances have a non-static compute capacity allocation that can be characterized by a baseline performance level and a burst performance level. The baseline performance level provides a guarantee regarding the minimum level of performance a customer using the burstable instance could expect over time (subject to some high degree of confidence). The burst performance level provides additional, on-demand capacity for the customer's workload to use when needed (subject to availability).

The ability of customer workloads executed on burstable instances to dynamically shift their resource usage of (or footprint on) a host computer system presents numerous challenges from a cloud resource management perspective. While the total capacity of a fleet of host computer systems might be sufficient to meet demand, both the burstable instances and the underlying host systems remain discrete components, preventing instantaneous, fluid-like shifts of demand across capacity. When tens or hundreds of thousands of burstable instances are placing dynamic demands on a fleet of hundreds or thousands of host computer systems, numerous problems arise when attempting to ensure individual host systems have capacity to support burst demands. These include how to decide on which host system to launch new burstable instances given existing demands, how to provide some degree of fairness to burstable instances hosted on the same host system when contention for resources occurs, how to reduce or avoid contention situations from arising, and how to re-shape or re-balance the fleet of host systems to meet demand while minimizing service interruptions.

Examples included in the present disclosure present solutions to these challenges. Such examples include new constraints on host system resource usage to provide sustained baseline performance guarantees, new placement processes when determining on which host system to launch a burstable instance, new scheduling techniques to improve the fairness of burstable instances hosted on the same host computer system during times of resource contention, new techniques to adjust host system availability in response to the dynamic resource usage of burstable instances, and new techniques to re-balance availability pools for different burstable instance types and/or sizes in view of existing availability.

FIG. 1 is a diagram illustrating an environment for managing cloud computing resources with burstable performance instances according to some examples. At a high level, a cloud provider network (also referred to as "provider network" or just "cloud"), such as cloud provider network 100, typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Exemplary resources offered by a cloud provider network include a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc.

The users (or "customers") of provider networks 100 can use one or more user accounts that are associated with a customer account, though these terms can be used somewhat interchangeably depending upon the context of use. Users can interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

To provide the above and other computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. A "hosted" resource is typically a resource, such as a compute instance, executed by or on one or more computer systems of the cloud provider network, which may be sited in a data center of the cloud provider network operator but also located on-prem or in facilities between such a data center and an end user or customer. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

The hardware virtualization service 112 (referred to in various implementations as an elastic compute service, a virtual machines service, a computing cloud service, a compute engine, or a cloud compute service) can enable users of the provider network 100 to provision and manage compute resources (also referred to generally as compute instances). For example, virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some examples, the execution of compute instances is supported by a lightweight virtual machine manager (VMM). These VMMs enable the launch of lightweight micro-virtual machines (micro VMs) in non-virtualized environments in fractions of a second. These VMMs can also enable container runtimes and container orchestrators to manage containers as micro VMs. These micro VMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of micro VMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

In some examples, the execution of compute instances is supported by containers. A container service (not shown) can be a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

Traditional instances are typically advertised as a fixed set of resources a user can expect to have available. For example, a traditional instance of a particular type and size might have 1 vCPU, 2 gigabytes of memory, and 100 megabits/second of network bandwidth. These different resources of an instance may be represented internally by a cloud provider network as a "resource vector." In contrast to traditional instances, burstable performance instances (or "burstable instances") have a "baseline" performance characteristic for a given resource that provides an expected sustained level of performance and a "burst" performance characteristic for the resource that provides a degree to which the instance can consume additional resources and typically also includes an expected burst availability. Although the balance of this disclosure focuses on compute capacity as the "bursting" resource for ease of explanation, the burst concepts disclosed herein can be extended to other resources like memory, network throughput, etc.

As illustrated in FIG. 1, example burstable instance sizes 199 graphically illustrate a small, medium, and large burstable instance sizes specified using the above nomenclature along one dimension of a resource vector (compute capacity). For reference, the compute capacity of a virtual processor (vCPU) is also shown. The large burstable instance size has a 40% vCPU baseline with up to a 100% vCPU burst, the medium burstable instance size has a 20% vCPU baseline with up to a 50% vCPU burst, and the small burstable instance size has a 10% vCPU baseline with up to a 25% vCPU burst. In some examples, burst availability can be qualified as the typical availability over some period of time (e.g., 95% availability over 24 hours). In some examples, burst is a sustained burst value. In such cases, instances with a sustained burst of below 100% vCPU (e.g., a small with a 25% vCPU burst) burst can still burst up to 100% vCPU usage for a limited period of time.

A vCPU represents an abstraction of the underlying physical processor or processor components allocated to instances on host systems. In some cases, instances can be advertised based on their actual physical compute unit instead of using the vCPU abstraction (e.g., a baseline of 40% of a core of a particular multi-core processor). Additional details regarding the relation between vCPUs and the underlying physical hardware of a host system are illustrated and described at least with reference to FIG. 6.

A customer or user of the provider network can send a request to launch a burstable instance to the hardware virtualization service 112 via an electronic device 102 and an interface such as an API (not shown) to the cloud provider network 100. The request can include an indication of the type and possibly size of the instance to launch. Using the example instance sizes 199 illustrated, a request might indicate a launch of a "small" size burstable performance instance.

A fleet of host computer systems 114 composed of many individual host computer systems (or "host systems") 115-1 through 115-N provides the capacity on which to launch compute instances.

As explained above, the hardware virtualization service 112 can enable users of the provider network 100 to provision and manage compute resources, including burstable instances. In servicing a launch request, the hardware virtualization service 112 can send a request to a placement service 116, the request for an identification of one or more candidate host systems 115 on which to configure and launch the burstable instance. The placement service 116 can improve fleet 114 utilization by providing candidate host system(s) 115 based at least in part on existing resource usage of host systems and expected or anticipated resource usage of the burstable instance to be launched. Additionally, the placement service 116 can impose limits on the launch of new instances on particular host systems 115 when actual usage exceeds expected usage. In effect, the placement service 116 provides a degree of heat management by intelligently controlling the distribution of burstable instance workloads across the fleet. Additional details regarding the placement service 116 are illustrated and described at least with reference to FIGS. 5 and 10.

A host packing service 118 can generate templates for host systems 115. Templates serve to logically divide a host system's available resources into "slots," where each slot represents capacity for a given instance type and size. For example, a template might divide a particular host system's resources into slots for two "large" burstable instances, two "medium" burstable instances, and two "small" burstable instances. In this manner, templates can thus be used to reserve portions of resources of the host system fleet for certain instance type and size combinations and to control the density by which hosts are "packed" onto host systems. The association between host systems 115 and a template can be stored in data store(s) 126.

Slots can be assigned various indicators to track the state of the associated resources. For example, an "available" state can indicate that a slot is available while a "used" state can indicate the slot is occupied by a compute instance. Various components of the cloud provider network can use the slots defined by a host system's template to track and manage both discrete capacity within a host and aggregate capacity across the fleet as described herein. The status of slots defined by a template associated with a given host system 115 can be stored in the data store(s) 126. Additional details regarding templates and slots are illustrated and described at least with reference to FIG. 3.

The hardware virtualization service 112 can send update requests to the placement service 116 for changes to instance status. The placement service 116 can use such updates to track resource usage of host systems 115. For example, if an instance is terminated (whether due to a user-request, a live migration, etc.), the hardware virtualization service 112 can send an update request to the placement service 116 to indicate that a particular instance is no longer running. The placement service 116 can update the associated slot status accordingly (e.g., changing a slot's status from "available" to "used" when an instance is launched and vice versa when an instance is terminated).

The host packing service 118 can also provide candidate templates to associate with host systems 115 to a capacity management service 124 during fleet rebalancing operations. Additional details regarding these operations are illustrated and described at least with reference to FIG. 11.

A host system management service 120 can collect usage metrics from individual host systems 115. The host system management service 120 can also generate various statistical measures regarding instance resource usage as illustrated and described at least with reference to FIG. 4. The host system management service 120 can also provide a degree of heat management during contention for host resources by adjusting the priority given to different instances on a particular host system by a scheduler as illustrated and described at least with reference to FIGS. 7 and 8.

In some examples, if a host system becomes "overheated," the host system management service 120 initiate the live migration of an instance hosted on the overheated host system to another host system via a live migration service 122.

Migration refers to moving compute instances (and/or other resources) between hosts in a cloud computing network or between hosts outside of the cloud computing network and hosts within the cloud. There are different types of migration including live migration and reboot migration. Techniques for various types of migration involve managing the critical phase—the time when the virtual machine instance is unavailable to the customer—which should be kept as short as possible.

During a reboot migration, the customer experiences an outage and an effective power cycle of their virtual machine instance. For example, a control plane service can coordinate a reboot migration workflow that involves tearing down the current domain on the original host (the "source") and subsequently creating a new domain for the virtual machine instance on the new host (the "target" or "destination"). The instance is rebooted by being shut down on the original host and booted up again on the new host.

Live migration refers to the process of moving a running virtual machine instance between different physical machines without significantly disrupting the availability of the virtual machine instance (e.g., the down time of the virtual machine instance is not noticeable by the end user). The live migration service 122 manages the live migration of instances from a "source" host system 115 to a different "destination" host system 115. Upon receipt of a live migration request (e.g., from the host system management service 120), the live migration service 122 can issue a request to a placement service 116, the request for an identification of one or more candidate host systems on which to place a burstable instance of the same type and size being migrated. The live migration service 122 can select a candidate host system ("destination" host system), if multiple, and issue a request to the hardware virtualization service 112 to allocate and launch an instance of that type and size on the destination system in a paused state (e.g., a new "inactive" domain associated with the instance is created on the target host system, while the original domain for the instance continues to run as the "active" domain on the source host). The live migration service 122 can then cause the state (e.g., vCPU registers, memory, storage data, network connectivity, etc.) of the burstable instance in the "active" domain to be captured on the source host system, transferred to the destination host system, and loaded into the corresponding state data for the instance in the "inactive" domain on the destination host system. For example, a local migration manager running on the source host system can send memory pages to the target host (also referred to as the "state" of the instance), track changes to the memory pages, and continue sending the changed pages to the target host. The instance may be briefly paused to prevent state changes while transferring a final set of memory contents to the target host. Thereafter, one or more of the control plane, the local migration manager, and the hypervisors (on the source and target hosts) can transition the inactive domain to become the active domain and demote the original active domain to become the inactive domain (sometimes referred to as a "flip"), after which the instance begins running on the target host, and the inactive domain can be discarded.

A capacity management service 124 manages the resources of the fleet of host computer systems to satisfy forecasted demand while accounting for the dynamic resource footprint of burstable instances. One or more layers of abstraction serve to decouple the particulars of the hardware configurations of host systems 115 and allow the capacity management service 124 to divvy up aggregate resources in the fleet into pools for different type and size combinations. Using templates and slots, for example, each host system can have an associated template that divides that host system's resources into slots of one or more types and sizes. The slots of a given instance type and size can together form a pool for that instance type and size independent of the underlying host systems 115 on which those slots are templated.

The capacity management service 124 allows for pools to be dynamically adjusted based on demand. Having static pool sizes risks denying customer requests while capacity remains unused. For example, consider a case where the fleet 114 has 700 vCPUs and there are only burstable instances in the example 199 small, medium, and large sizes. A large burstable instance has a 0.4 vCPU baseline, a medium burstable instance has a 0.2 vCPU baseline, and a small burstable instance has a 0.1 vCPU baseline. If baseline performance is the factor by which fleet resources are divided, in one extreme the fleet resources could be divided into 1,750 slots (700/0.4) for large burstable instances and zero slots for medium and small burstable instances. If a customer requested a launch of a small burstable instance, such a request can fail since there were no available slots for the small burstable instance despite capacity templated for large slots remaining unused. A middle-ground approach that creates equally-sized pools may also be undesired. For example, the 700 vCPUs could be divided to create a pool of 1,000 slots for each of the large, medium, and small burstable instance sizes. Customer demand is typically not uniform, however, so if the medium burstable instance is more popular, once the 1,000 slots have been used, additional requests to launch medium burstable instances can fail despite capacity templated for large and small slots remaining unused.

Rather than have static pool sizes, the capacity management service 124 reshapes how unused fleet capacity is allocated to pools of different instance types or different size and type combinations. Such re-shaping (also referred to as re-balancing) can occur periodically to account for changing customer demand based upon demand forecasts. In this manner, the capacity management service 124 can improve resource utilization across the fleet. Additional details regarding rebalancing by the capacity management service 124 are illustrated and described at least with reference to FIG. 11.

Data store(s) 126 store various configuration and tracking data used by the other illustrated components as part of launching burstable instances and managing those burstable instances and the fleet. Exemplary data includes host data that associates templates with host systems and tracks slot state, host system resource usage metrics that provide measured resource usage levels at the host-level, and instance resource usage profiles that provide resource usage characterizations of instances at different degrees of detail (e.g., by specific instance; by particular instance type, size, and customer; by instance type and size; etc.).

Communications between components illustrated within the cloud provider network 100 are typically carried out via API. For example, the hardware virtualization service 112 can vend a launch API to the electronic device 102 and the live migration service 112, the placement service 116 can vend a placement request API to the hardware virtualization service 112 and the live migration service 122. The live migration service can vend a migration API to the host system management service 120. The host systems 115 can vend various compute instance creation and launch APIs to the hardware virtualization service 112 to allow for the allocation of resource for and the launch of compute instances. The host systems 115 can also vend various management APIs (e.g., to collect metrics, to receive instructions) to the host system management service 120. The capacity management service 124 can vend APIs to allow the placement service 116 to flag slots as constrained or remove such constraints. The host packing service 118 can vend APIs to allow the capacity management service 124 to obtain candidate templates subject to certain constraints during re-balancing operations.

Figure 2:
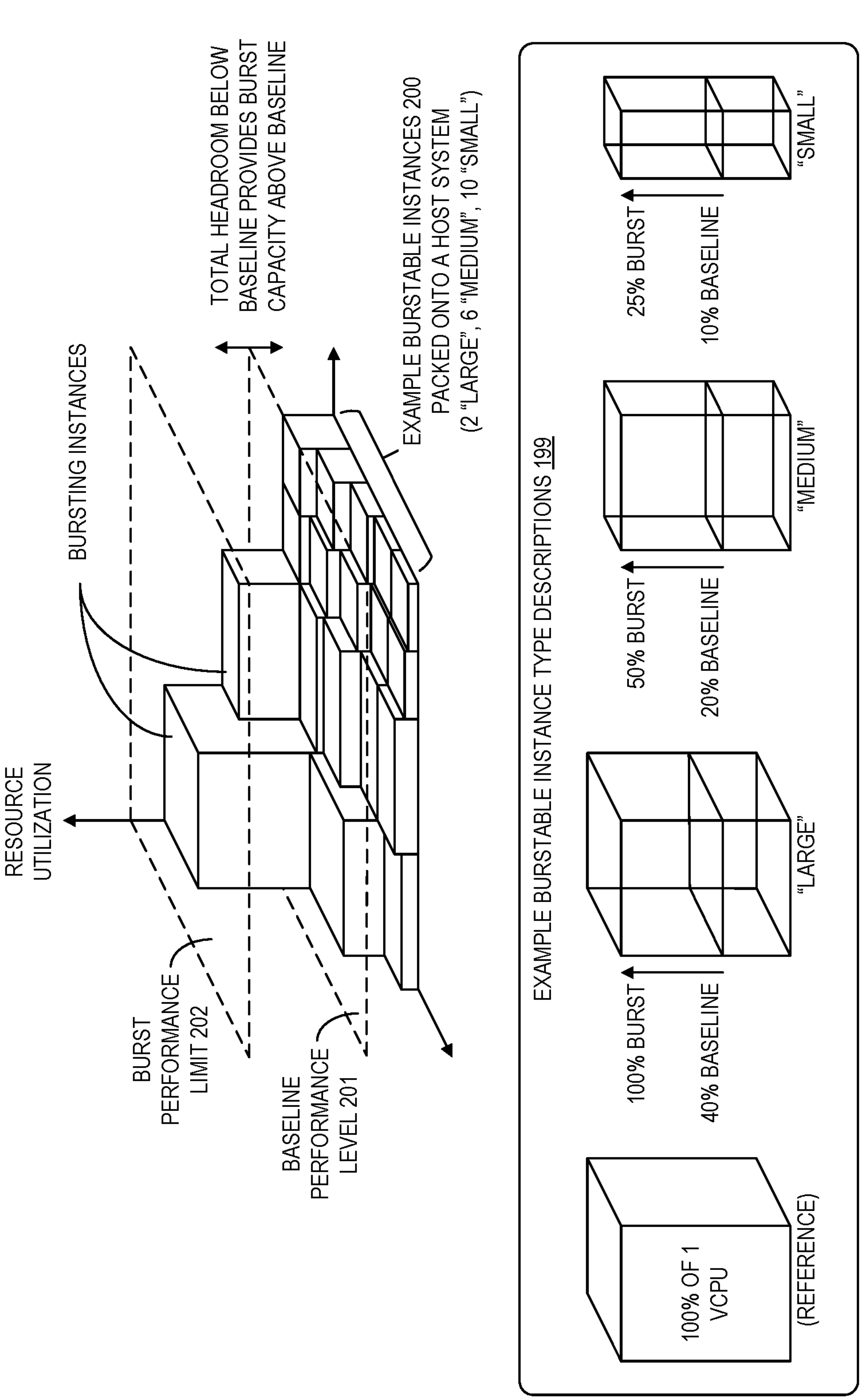
FIG. 2 is a diagram illustrating aspects of exemplary burstable performance instance sizes according to some examples.

FIG. 2 is a diagram illustrating aspects of exemplary burstable performance instance sizes according to some examples. In particular, FIG. 2 illustrates the relationship between baseline and burst performance for burstable performance instances. The top portion of FIG. 2 illustrates an example set of burstable instances 200 packed onto a host system. Leveraging the example instance sizes 199, the host system includes two "large" burstable instances, six "medium" burstable instances, and ten "small" burstable instances. The vertical axis represents the resource utilization (in this case, compute) of each instance. While the advertised baseline performance level for a burstable instance serves as an approximate floor for worst-case performance during periods of contention, often burstable instances will operate below that level. The amount of headroom provided by some burstable instances operating below their baseline performance level 201 provides for the burst capacity that can be used, as-needed, by other burstable instances up to their associated burst performance limit 202. With credit-based bursting, compute instances could only burst by expending credits, which may be accumulated over time by operating at or below baseline, or which may be purchased, for example. Burstable instances as contemplated herein can burst above their associated baseline performance level using the compute capacity headroom without credits, with the amount of headroom and/or the apportionment of that headroom managed by the techniques described herein. As illustrated, one large burstable instance and one medium burstable instance are "bursting" using the headroom provided by the remaining burstable instances operating below their baseline performance level.

Figure 3:
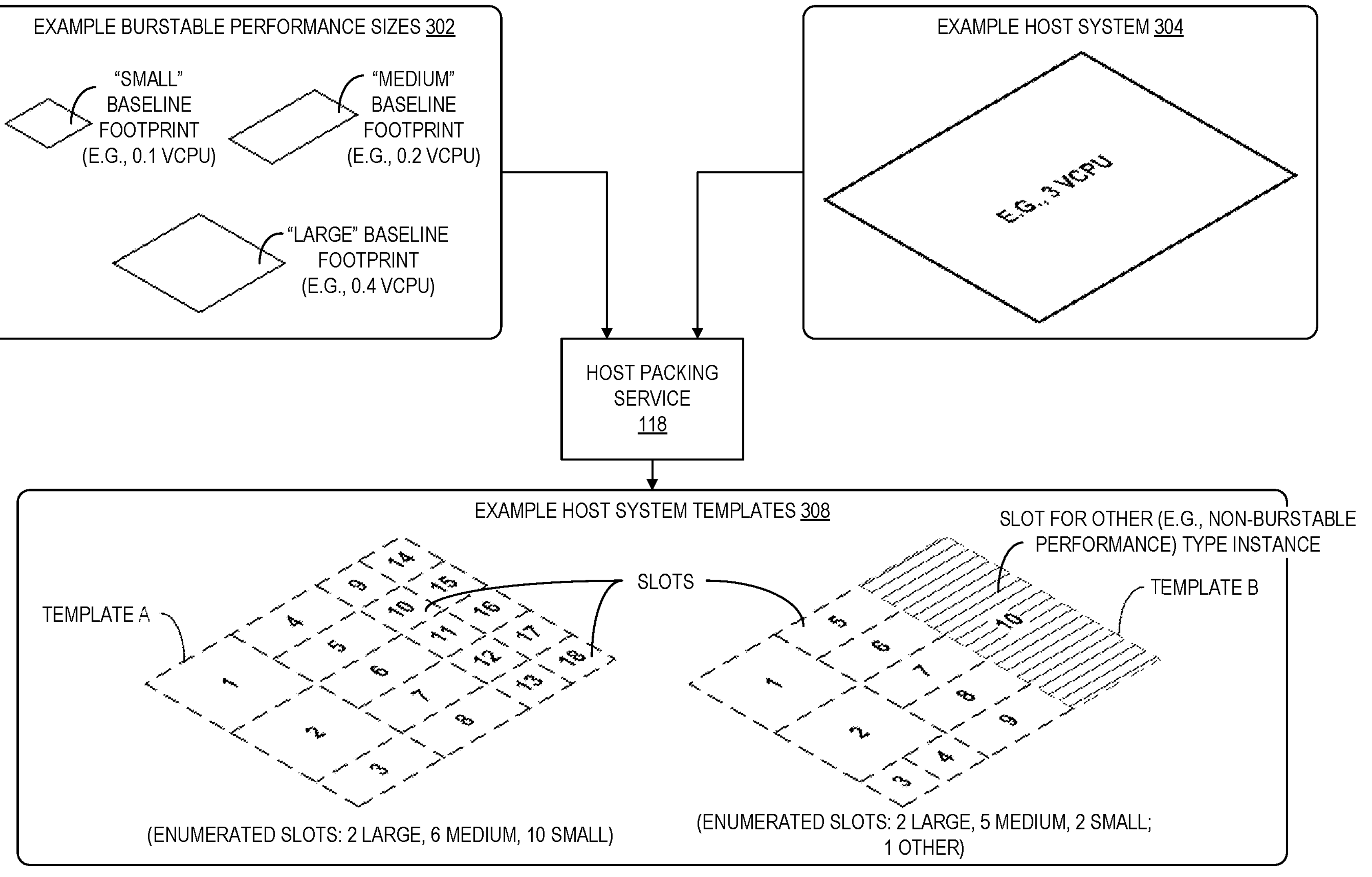
FIG. 3 is a diagram illustrating a technique for divvying up host system resources for instances and tracking host system resource usage according to some examples.

FIG. 3 is a diagram illustrating a technique for divvying up host system resources for instances and tracking host system resource usage according to some examples. In particular, templates are a construct that serves to logically divide a host system's available resources into "slots" where each slot represents capacity for a given instance size. In this manner, a template represents a particular combination of one or more slots.

The host packing service 118 can generate templates for host systems of a particular hardware configuration. In general, the host packing service 118 can receive a plurality of resource vectors describing the various instance types as well as a resource vector describing the hardware configuration of the host system. The instance type resource vectors may be pre-defined by the cloud provider network operator based on workload characterizations of customer instances. The host packing service 118 can use a bin-packing algorithm to generate various templates with different combinations of instance types and/or sizes.

The particular example of FIG. 3 shows two possible output templates 308 in the simple case of a single resource dimension—compute capacity. To facilitate the provisioning of baseline performance guarantees for burstable instances, the example burstable performance instance sizes 302 are specified using their associated baseline characteristic—0.4 vCPU for the large size, 0.2 vCPU for the medium size, and 0.1 vCPU for the small size. The resource vector describing the example host system 304 is represented in similar units—3 vCPUs. The host packing service 118 can use a bin-packing algorithm to generate templates that would fit within the host system subject to optional constraints (e.g., zero large slots, exactly three medium slots, etc.), and typically with the minimal amount of unused allocation. In some cases, the host packing service 118 can calculate all possible combinations (e.g., Template X is zero large, zero medium, 30 small; Template Y is zero large, 1 medium, 28 small; and so on). The host packing service 118 can store all generated templates as template data in a data store (not shown).

Template A and Template B represent two of many possible outputs. Template A includes two large burstable instance slots, six medium burstable instance slots, and ten small burstable instance slots (corresponding to the example packing shown in FIG. 2). Template B shows that host system resources can be divided amongst instances of different types. As illustrated, template B includes two large burstable instance slots, five medium burstable instance slots, two small burstable instance slots, and a slot for another non-burstable type instance (e.g., a fixed compute capacity allocation instance of 1 vCPU).

Slots within a template can be enumerated with identifiers. In template A, for example, the large burstable instance slots are numbered 1 and 2, the medium burstable instance slots are numbered 3 through 8, and the small burstable instance slots are numbered 9 through 18. Host data (not shown) can track, per-host, the current template associated with the host and the availability of the slots described by that template (e.g., used, available, etc.). A tuple including a host system identifier and a slot identifier can be used to locate slot status (e.g., used, available) in host data, for example.

As mentioned above, instances of different sizes can be represented using a "resource vector" based on their instantiated resource allocation. Similarly, host systems can be described in terms of resource vectors based on their physical resources. The divvying up of resources (compute, memory, disk, network, etc.) need not be proportional. In other words, while slot 1 of template A accounts for ~13% of the compute capacity of the host system (i.e., 0.4 vCPUs out of 3 vCPUs), slot 1 can have a different proportion of the host systems total memory.

Figure 4:
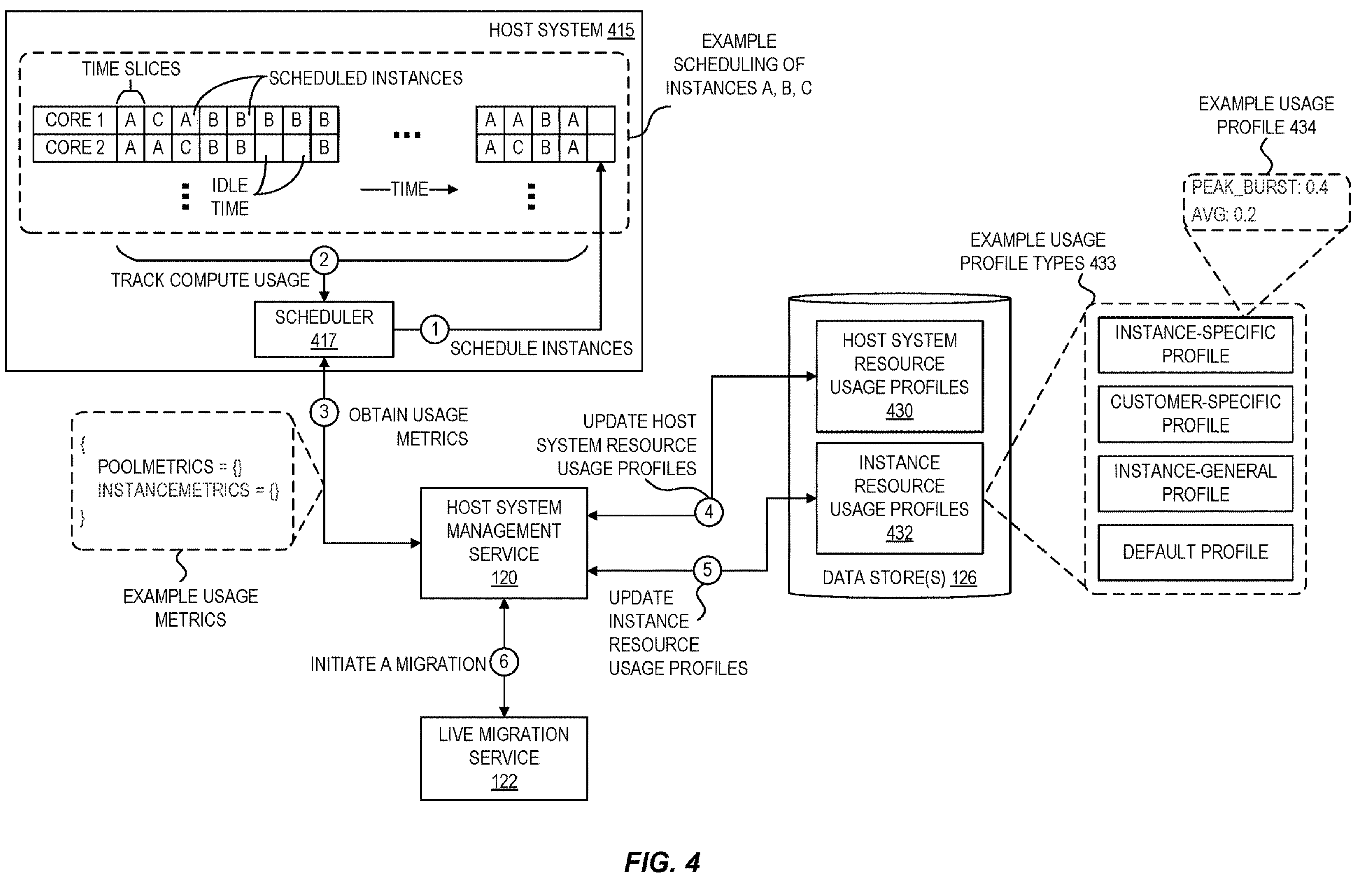
FIG. 4 is a diagram illustrating performance metrics gathering from host systems and various other operations according to some examples.

FIG. 4 is a diagram illustrating performance metrics gathering from host systems and various other operations according to some examples. In most modern computer systems, processor time is divided into time slices. A scheduler is responsible for allocating those time slices amongst entities (processes, typically) competing for processor time. Processes requesting processor time typically enter a queue. Before the start of each time slice, the scheduler will select one or more processes from the queue to be granted processor time in that time slice. As indicated at circle 1, a scheduler 417 of a host system 415 will schedule or pin processes to the processor for the next time slice. In this example, the processor is a multi-core processor with two cores, and three processes A, B, and C sharing processor time. As indicated at circle 1, the far right time slice, representing time slice t, has yet to be allocated. Previously, at time slice t-1, process A was allocated both cores, at time slice t-2, process B was allocated both cores, at time slice t-3, process A was allocated core 1 and process C was allocated core 2, and so on.

In the case of burstable instances, each burstable instance can correspond to a process. Details of compute allocation and scheduling techniques for burstable instances are illustrated and described at least with reference to FIGS. 6 through 8.

Besides scheduling processes, the scheduler 417 can also track various metrics representing compute usage, as indicated at circle 2. Such metrics typically include one or more metrics related to track per-instance compute usage and one or more metrics to track overall compute usage. Per-instance compute usage can be reported per-core or aggregated across cores. Overall compute usage might be tracked per-core, per-processor (having multiple cores), per-NUMA (non-uniform memory access) node, etc. Metrics can be tracked in relative or absolute terms (e.g., as a percentage of time or time slices, or as a total number of time or time slices).

As indicated at circle 3, the host system management service 120 can obtain usage metrics from host systems such as the host system 415. Such an operation may be performed regularly as part of a scheduler update workflow (see FIG. 7). Usage metrics typically represent usage data since the last time the host system management service 120 obtained usage metrics. An exemplary set of metrics provided in object notation is shown below.

```
{
        timestamp = "2021-06-15T07:58:36.001Z"
        poolmetrics = {
                1 = {
                        pool_id = # The NUMA node number
```

-continued

```
                cpu_util_us = # the sum of system time, instance time and forced-idle
                        time
                forced_idle_us = # Total time instances spent waiting
                cpu_count = 64
            },
            2 = {
                ...
            }
            ...
        }
        instancemetrics = {
            1 = {
                instanceid = # Instance identifier
                slotid = # Slot identifier
                cpu_used_us = # Aggregate time used by instance on each cpus
                idle_us = # Aggregate time idling
                waiting_time_us = # Aggregate time waiting
            },
            2 = {
                ...
            }
            ...
        }
}
```

As indicated at circle 4, the host system management service 120 can update (or create, if none exists) a host system resource usage profile 430 for the host system 415 in the data store 126. For example, the host system management service 120 can calculate a statistic related to the utilization of core, processor, pool, and/or other division of host physical compute resources, which may be based upon on previously stored metrics. For example, an average utilization can be computed based on the most recent set of metrics and those previously obtained within the last 24-hour period. Such a statistic can be expressed in vCPU units (e.g., average of 5 vCPUs used out of 10 total vCPUs).

As indicated at circle 5, the host system management service 120 can update (or create, if none exists) an instance usage profile 432 for an instance (e.g., instance A, B, and/or C) in the data store 126. Various statistics can be calculated characterizing an instance or instances at different levels of abstraction, such as indicated by the example usage profile types 433. For example, a usage profile of a specific instance (e.g., one launched from a particular pre-defined machine image resulting in a somewhat predictable workload) can be calculated (e.g., by averaging previously collected metrics for that instance). A usage profile of all of a customer's instances of a particular type and size can be calculated (e.g., by averaging metrics collected for all instances of a given type and size of a particular customer). A usage profile of all instances of a particular type and size can be calculated (e.g., by averaging metrics collected for all instances of a given type and size). A default usage profile can correspond to the expected utilization of an associated burstable instance size (e.g., 0.1 baseline vCPU for small, 0.2 baseline vCPU for medium, 0.4 baseline vCPU for large). An example usage profile 434 of any type can include one or more statistics, such as an average utilization and peak burst, which again can be expressed in terms of vCPU units.

Note that the obtaining of metrics (circle 3), the updating of host system resource usage profiles (circle 4), and the updating of instance resource usage profiles (circle 5) by the host system management service 120 can be independent workflows. In other words, the obtaining of metrics from a host system need not trigger the updating of usage profiles. Metrics might be obtained at approximately a first interval, while usage profiles of one or both host system and instances may be updated based on a schedule, set number of metric retrievals, etc.

As indicated at circle 6, the host system management service 120 can initiate a live migration in the event a host system becomes "overheated." A live migration policy can include one or more rules for determining when a host system is "overheated" and how to respond. For example, the host system management service 120 can determine that a host system is overheated if one or more thresholds are met. For example, a threshold can be based on an average overall compute resource utilization rising above a value. As another example, a threshold can be based on the burst availability for burstable instances hosted on the host system falling below a value. For example, the host system management service 120 can obtain the historical or a predicted peak burst for each of the hosted burstable performance instances from the instance usage profiles data 432. The host system management service 120 can sum the peak burst for each instance and compare whether that total is greater than some threshold above the total vCPU capacity of the associated host system. In some cases, scale factors can be used to adjust the metrics being used in the threshold comparisons (e.g., scaling the total peak usage by some value, scaling the average overall compute resource utilization by some value, etc.). In some cases, the host system management service 120 may require multiple thresholds to be met before initiating a live migration.

The live migration policy can further indicate how the host system management service 120 should respond once it has been determined that a host system has been overheated. For example, the policy may indicate that the top N instances with the highest resource utilization should be live migrated (to reduce the number of live migrations). As another example, the policy may indicate that the bottom N instances with the lowest resource utilization should be live migrated (to reduce interruptions to a "hot" workload). As yet another example, the policy may randomly select one or more instances for migration, effectively migrating an "average" instance when applied fleet-wide. Based on the policy, the host system management service 120 can send a request to the live migration service 122 to initiate a live migration, the request including the identity of the instance or the identities of the instances to be migrated.

Figure 5:
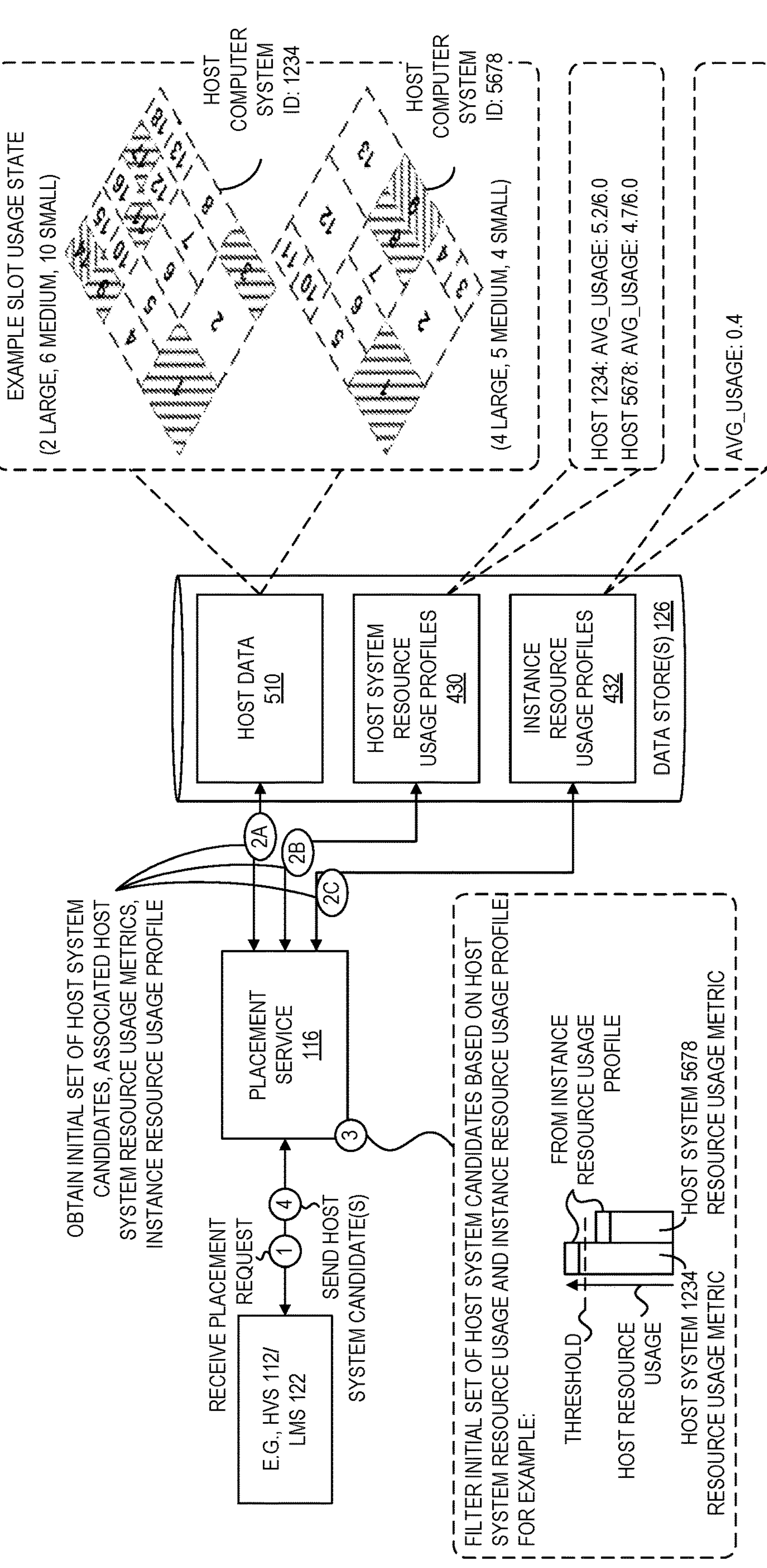
FIG. 5 is a diagram illustrating aspects of placing burstable performance instances on cloud computing resources according to some examples.

FIG. 5 is a diagram illustrating aspects of placing burstable performance instances on cloud computing resources according to some examples. At a high level, the placement service 116 services placement requests by providing an indication of the location to launch compute instances. Such a location can be provided in terms of a host identifier, a host and slot identifier, a set of candidate hosts (by identifier), or a set of candidate hosts and slots (again, by host and slot identifiers).

As indicated at circle 1, the placement service 116 receives a placement request from, for example, the hardware virtualization service 112 or the live migration service 122. Such a request typically includes an indication of the type and possibly size of instance requested to be launched and can further include an indication of the machine image from which the instance is being launched, if any, and/or the customer on whose behalf the instance is being launched.

As indicated at circles 2A-2C, the placement service 116 obtains data from data store(s) 126 to use to respond to the request. In particular, the placement service 116 obtains an initial set of host candidates from the host data 510. For example, if the placement request indicated a medium burstable instance, the placement service 116 can obtain an identification of host systems having one or more available slots for a medium burstable instance.

As a simplified example, assume the host system fleet has two host systems identified as 1234 and 5678. Example slot usage data of the two host systems can be stored in host data 510 as follows.

| HOST | TYPE | SIZE | AVAILABLE | USED |
|---|---|---|---|---|
| 1234 | BURST | SMALL | 6 | 4 |
| | BURST | MEDIUM | 5 | 1 |
| | BURST | LARGE | 1 | 1 |
| 5678 | BURST | SMALL | 4 | 0 |
| | BURST | MEDIUM | 3 | 2 |
| | BURST | LARGE | 3 | 1 |

A graphical depiction of this state is shown on the right side of FIG. 5. In this example, both host systems—1234 and 5678—have an available medium slot. Note that in some examples, host data 510 can be stored in a queryable database such that the availability of a slot for a particular instance type and size can be specified as a parameter in the query. In other examples, another service (not shown) may vend an API via which the placement service 116 can submit requests for initial sets of candidates.

As indicated at circle 2A, the placement service 116 obtains an initial set of candidate host systems including host system 1234 and host system 5678 based on the host data 510.

As indicated at circle 2B, the placement service 116 obtains a resource usage profile for each of the candidate host systems identified in the initial set from the host system resource usage profiles 430. Here, the host system 1234 has an average usage of 5.2 out of 6 vCPUs, and the host system 5678 has an average usage of 4.7 out of 6 vCPUs.

As indicated at circle 2C, the placement service 116 obtains an instance resource usage profile from the instance usage profiles data 432. As described with reference to FIG. 4, instance resource usage profiles data 432 can have different profiles at varying degrees of specificity. For example, some instance resource usage profiles can be associated with particular instances, others with instances of a particular type and size of a particular customer, others with instances of a particular type and size across customers, etc. The placement service 116 typically obtains the most-specific instance resource usage profile available based upon the data included in the placement request. For example, if the placement request included an indication of the machine image from which the instance is being launched and an associated resource usage profile exists, the placement service 116 can use that instance-specific usage profile. As another example, if the placement request included an indication of the customer on whose behalf the instance is being launched, the placement service 116 can obtain a customer-specific instance usage profile for instances of the type and size of the burstable instance to be launched, if available. As another example, if the only identification of the instance is its type and size, the placement service will use the historical usage profile for that type and size of burstable instance, which, if unavailable, will result in a default instance resource usage profile being used.

As indicated at circle 3, the placement service 116 filters the initial set of candidate host systems based upon the obtained resource usage profile for each of the candidate host systems and the instance resource usage profile. For example, the placement service 116 can check whether the host system resource usage plus the instance resource usage would exceed some threshold and, if so, eliminate the corresponding host system as a candidate. As illustrated, and assuming a threshold of less than 10% remaining host capacity, the host system resource usage of host system 1234 plus the instance resource usage exceeds the threshold (i.e., (5.2+0.4)/6.0=~93% capacity) while the host system resource usage of host system 5678 plus the instance resource usage does not (i.e., (4.7+0.4)/6.0=85%). Thus, host system 5678 would pass the filtering operation.

As indicated at circle 4, the placement service 116 returns a response to the placement request. Again, the response can include a location provided in terms of a host identifier, a host and slot identifier, a set of candidate hosts (by identifier), or a set of candidate hosts and slots (again, by host and slot identifiers). In this case, the set of host system candidates obtained at circle 2A was filtered to eliminate host system 1234 at circle 3, resulting in a response that includes an identification of host system 5678 and, optionally, the available medium slots (e.g., 5, 6, and 7).

If the placement service 116 returns a set of candidates in response to a placement request, the placement service 116 can order the set based upon the estimated headroom as determined during the filtering operation of circle 3. The recipient service (e.g., the HVS 112 or the LMS 122) can select a host from the set from the set (e.g., the first one, if an ordered set) and attempt to launch an instance. If the launch fails for some reason, the service can attempt to launch an instance on another host in the set, and so on, reducing repeat queries to the placement service 116. Once launched, the HVS 112 can send an update request to the placement service 116 to update the host data 510 to reflect the changed state of a slot from available to used.

Figure 6:
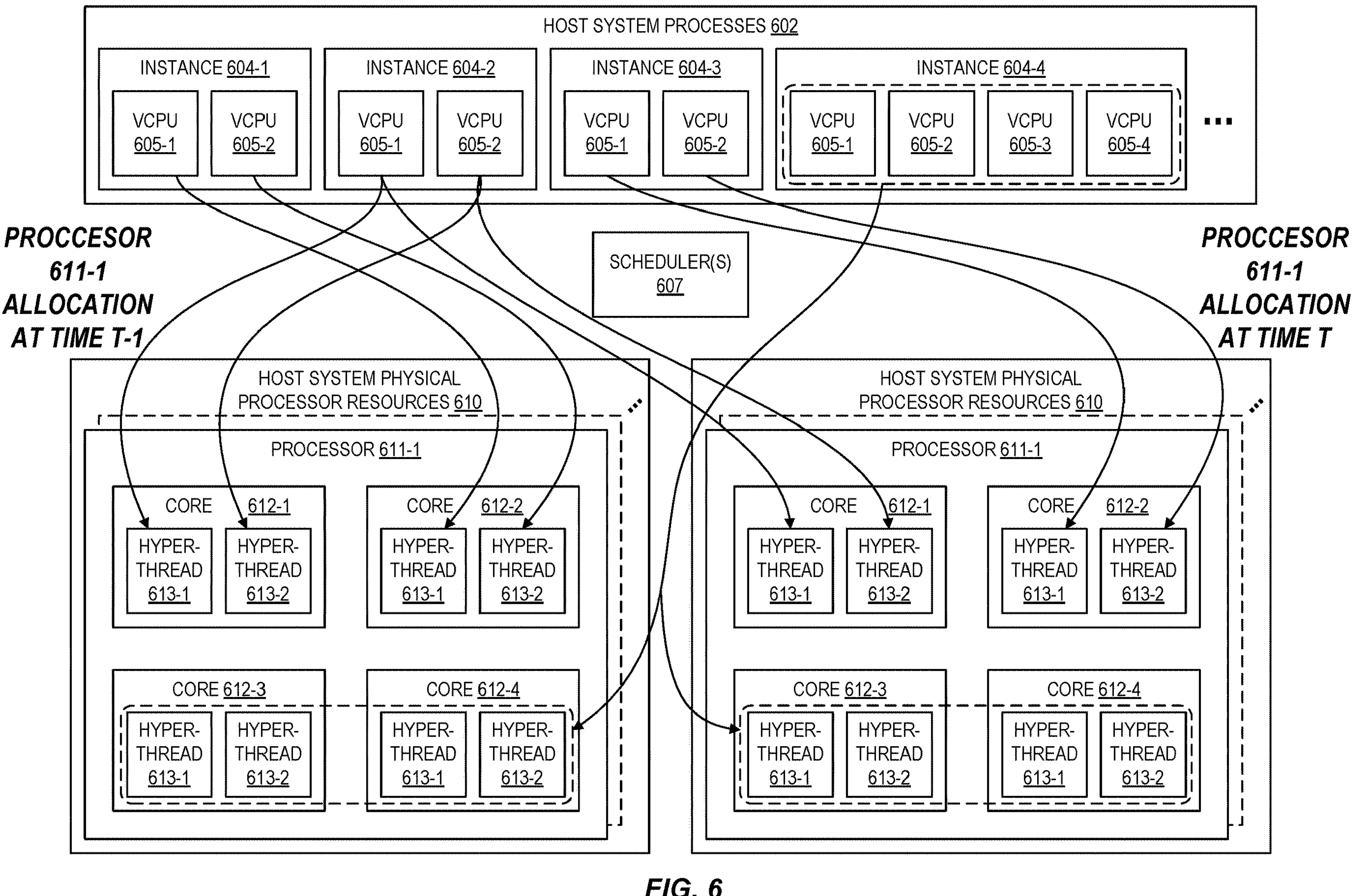
FIG. 6 is a diagram illustrating host system resource sharing between burstable performance instances according to some examples.

FIG. 6 is a diagram illustrating host system resource sharing between burstable performance instances according to some examples. Illustrated at the top of FIG. 6 are host system processes 602, which can correspond to compute instances such as burstable instances. Four processes 604-1 through 604-4 are shown, although many more may exist. Other non-instance processes may exist, too. The instances 604-1 through 604-3 each have a two vCPU allocation (though the baseline and burst performances are not shown here). Instance 604-4 has a four vCPU allocation.

Illustrated at the bottom of FIG. 6 are the physical compute resources of an exemplary host system 610 at one point in time (left) and the same host system 610 at another, later point in time (right). The host system 610 includes one or more processors 611, each processor being a multiple core processor having four cores 612-1 through 612-4. Each core 612 supports multi-threading and has two hyper-threads 613-1 and 613-2.

As described above, processing capacity is typically dividing in time into time slices. One or more schedulers 607 allocate physical compute resources to processes during time slices. In some examples, each processor or group of processors may have an associated scheduler 607, and each scheduler may have an associated group of processes 602 that it manages on its associated processor or group of processors.

As described above, the vCPU serves as an abstraction of some underlying physical compute units (e.g., hyper-threads, cores, etc.). Various mappings between a vCPU and the underlying physical compute units are possible, subject to the processor architecture. One possible mapping is shown, with vCPUs 605 mapping to hyper-threads 613.

As shown at time t-1, the vCPUs 605-01 and 605-2 of the instance 604-1 were executed by the hyper-threads 613-1 and 613-2 of the core 612-2, the vCPUs 605-01 and 605-2 of the instance 604-2 were executed by the hyper-threads 613-1 and 613-2 the core 612-1, the instance 604-3 was either idle or forced to wait, and the vCPUs 605-01 through 605-4 of the instance 604-4 were executed by cores the hyper-threads 613-1 and 613-2 of the core 612-3 and the hyper-threads 613-1 and 613-2 of the core of the core 612-4. As shown at time t, the instance 604-1 was either idle or forced to wait, the instance 604-2 continued execution on core 612-1, the vCPUs 605-01 and 605-2 of the instance 604-3 were executed by the hyper-threads 613-1 and 613-2 of the core 612-2, and the instance 604-4 continued execution on cores 612-3 and 612-4.

Note that in some examples that use processors supporting hyper-threading, the scheduler 607 treats cores as atomic units to prevent one instance from executing on one hyper-thread of one core and another instance, possible owned by another customer, from executing on another hyper-thread of the same core. Doing so can prevent one customer from possibly gaining insight into the workload of another customer via side-channel attack. To avoid under-utilizing hyper-thread compute capacity, instances can be allocated an even number of vCPUs.

Figure 7:
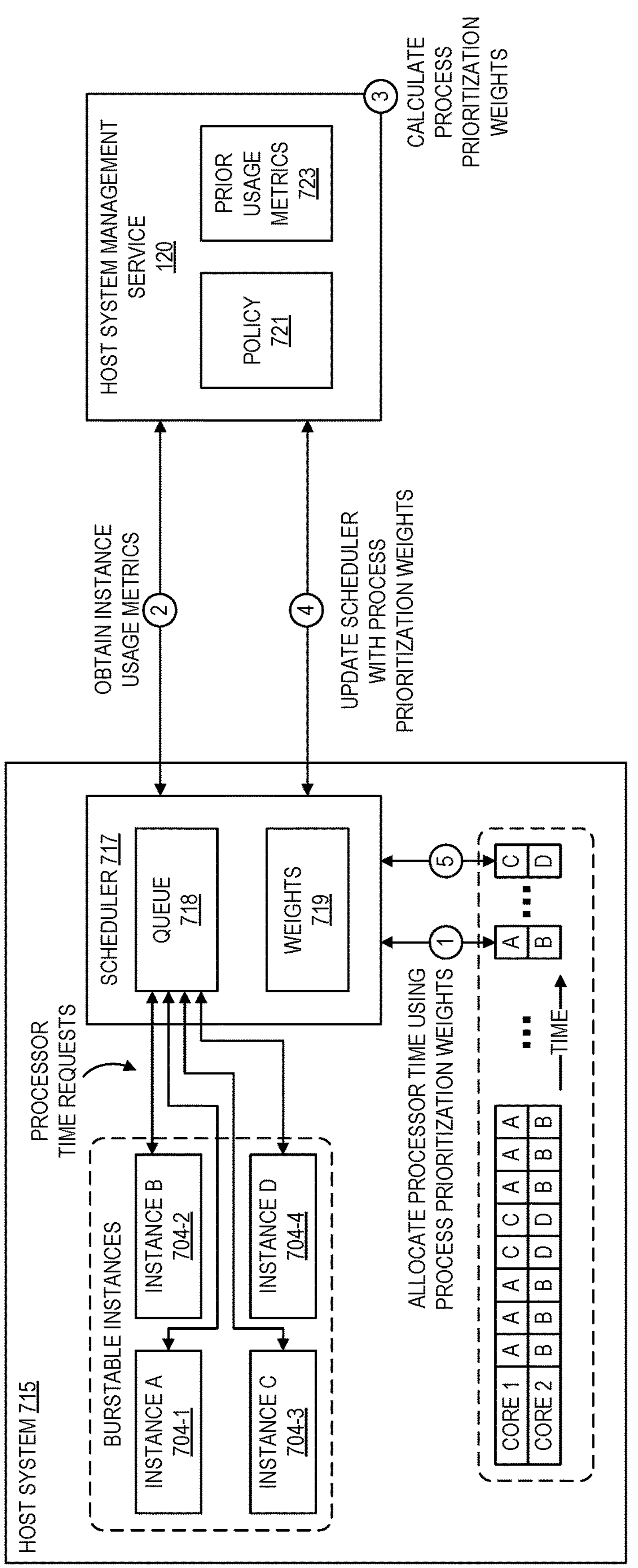
FIG. 7 is a diagram illustrating aspects of burstable performance instance prioritization by a scheduler of a host system according to some examples.

FIG. 7 is a diagram illustrating aspects of burstable performance instance prioritization by a scheduler of a host system according to some examples. As mentioned above, burstable instances operating below their baseline performance level provide the headroom for other burstable instances to burst or operate above their baseline performance level. A scheduler distributes that headroom, or excess compute capacity, amongst the competing demands of burstable instances. To provide a degree of fairness to the allocation of that headroom, the scheduler uses process prioritization weights, which the host system management service 120 updates occasionally (e.g., every second, every half second, every ten seconds, etc.).

The following example is illustrative of the process prioritization weights update workflow. An example host system 715 includes a scheduler 717 and two cores on which to execute hosted instances. The scheduler 717 includes a queue 718 that includes an indication of which processes (e.g., instances) have requested processor time. The host system 715 is host to four burstable instances 704-1 ("A"), 704-2 ("B"), 704-3 ("C"), and 704-4 ("D"). As indicated at circle 1, the scheduler 717 can evaluate the process prioritization weights 719 associated with each enqueued process request in allocating compute capacity for the upcoming time slice to determine the order in which to allocate resources (with any remaining enqueued requests waiting until at least the next time slice). For example, if all four instances A through D have queued and instances A and B have higher process prioritization weights than instances C and D, the scheduler 717 can allocate the two cores to instances A and B in the upcoming time slice. In some cases, entries in the queue can have an associated wait time. The scheduler 717 can scale the process prioritization weights 719 for a given instance by its associated wait time to determine resource allocations for a time slice to avoid starving an instance of compute time.

As indicated at circle 2, the host system management service 120 obtains per-instance usage metrics, such as illustrated and described at least with reference to FIG. 4 (e.g., the "instancemetrics" in the example set of metrics).

As indicated at circle 3, the host system management service 120 calculates updated process prioritization weights, typically according to a fairness policy 721. An example process prioritization weights calculation according to a policy 721 that prioritizes lower burst utilization over higher burst utilization instances while protecting each instance's baseline performance level follows.

The host system management service 120 determines a baseline priority weight for each instance. Such a baseline priority weight can be the product of the baseline performance level and the number of vCPUs for a particular instance. For example, a two vCPU, 10% baseline performance level burstable instance would have a baseline priority weight of 0.2, while a four vCPU, 40% baseline performance level burstable instance would have a baseline priority weight of 1.6.

By summing the baseline priority weights (which reflect a baseline guarantee in vCPUs) of each instance, the host system management service 120 can determine the total baseline needed to be reserved to satisfy baseline performance levels.

The host system management service 120 can then either lookup or calculate the total capacity of a host system. For example, for a host system such as the one illustrated in FIG. 6. having a single processor, the total vCPU capacity of that system might be eight (i.e., four cores at two hyper-threads, or vCPUs under that mapping, per core).

Subtracting the total baseline from the total capacity of the of the host system, the host system management service 120 can determine how much potential overhead can exist or the "total burst" capacity of the host system.

The host system management service 120 can calculate an average compute utilization for each instance. Such an average can be calculated as a cumulative moving average, a simple moving average, etc. The host system management service 120 can store prior usage metrics 723 to facilitate the calculation of the moving average. In some cases, the obtained metric might represent total compute usage time per-instance such that larger burstable instance having a higher allocation of vCPUs could have higher averages. In such cases, the host system management service 120 can normalize the usage time for each instance by the associated number of vCPUs allocated to that instance.

The host system management service 120 can then use the average compute utilization for each instance to generate an "active" index that can be used to order the relative usage of each compute instance with higher indexes reflecting higher activity. For example, the host system management service 120 can generate the active index by normalizing the average compute utilization (e.g., as determined by a moving average) for each instance by its associated baseline performance level. For example, one of the small instances described above with an average vCPU utilization of 50% with a baseline performance level of 10% would be given an active index of 5, while one of the large instances described above with an average vCPU utilization of 60% with a baseline performance level of 40% would be given an active index of 1.5.

In another example, the host system management service 120 can generate the active index based on an exponentially weighted moving average as follows:

$$index_t = \begin{cases} \frac{c}{b} & \text{if } t = 1 \\ a \cdot \frac{b}{c} + (1 - a) \cdot \text{index}_{t-1} & \text{if } t > 1 \end{cases}$$

where t is the observation index, c is the average vCPU utilization of the instance between observations t−1 and t, b is the per-vCPU baseline, and a is a weighting coefficient ranging from 0 to 1 such that higher values of a discount older observations faster. An example value for α is 0.5.

The host system management service 120 can the invert the active index to generate a "passive" index to order the relative usage of each compute instance with higher indexes reflecting lower activity.

The host system management service 120 can then generate a burst priority weight for each instance. The host system management service 120 can calculate the burst priority weight for a given instance by dividing the instance's passive index by the sum of all of the passive indexes, and multiplying that result by the total burst capacity described above. The burst priority weight for an instance reflects the priority the instance should be given in addition to its baseline priority.

The host system management service 120 can then calculate a final updated process prioritization weight for a particular instance by summing the burst priority weight and baseline priority weight calculated for that instance. Calculating a final updated process prioritization weight for each of the instances results in a new set of updated process prioritization weights.

Other policies can take different approaches to calculating process prioritization weights. For example, a naïve policy might ignore all previously obtained metrics and generate weights inversely proportional to the compute usage obtained in the most recent set of metrics (e.g., at circle 2).

After calculating updated process prioritization weights, the host system management service 120 updates the weights 719 of scheduler 717 as indicated at circle 4. As indicated at circle 5 (some time after the prior core time allocation at circle 1), the scheduler 717 can evaluate the updated process prioritization weights 719 associated with each enqueued process request in allocating compute capacity for the upcoming time slice to determine the order in which to allocate resources (with any remaining enqueued requests waiting until at least the next time slice). In the illustrated example, instances "A" and "B" appear to have used more time slices than instances "C" and "D," so the updated weights 719 might favor instances "C" and "D," at least until the next round of weight updates.

By updating process prioritization weights based on past usage and instance size such as described above, the host system management service 120 can cause a host system scheduler to fairly distribute excess compute capacity amongst burstable instances hosted on the host system. In contrast to the above management of compute capacity headroom amongst "creditless" burstable instances by the scheduler 717 and host system management service 120, prior "credit-based" instance bursting was based on the availability of credits—whether accumulated or purchased—for a given instance.

In some examples, additional adjustments can be applied to the "final" process prioritization weights before updating a scheduler. The above example assumes a scheduler prioritizes processes with a higher process prioritization weight. That might not always be the case as some schedulers might prioritize lower weights. Thus, the host system management service 120 can perform other operations on the weights to invert, scale, or otherwise adjust the weights prior to updating a scheduler.

Figure 8:
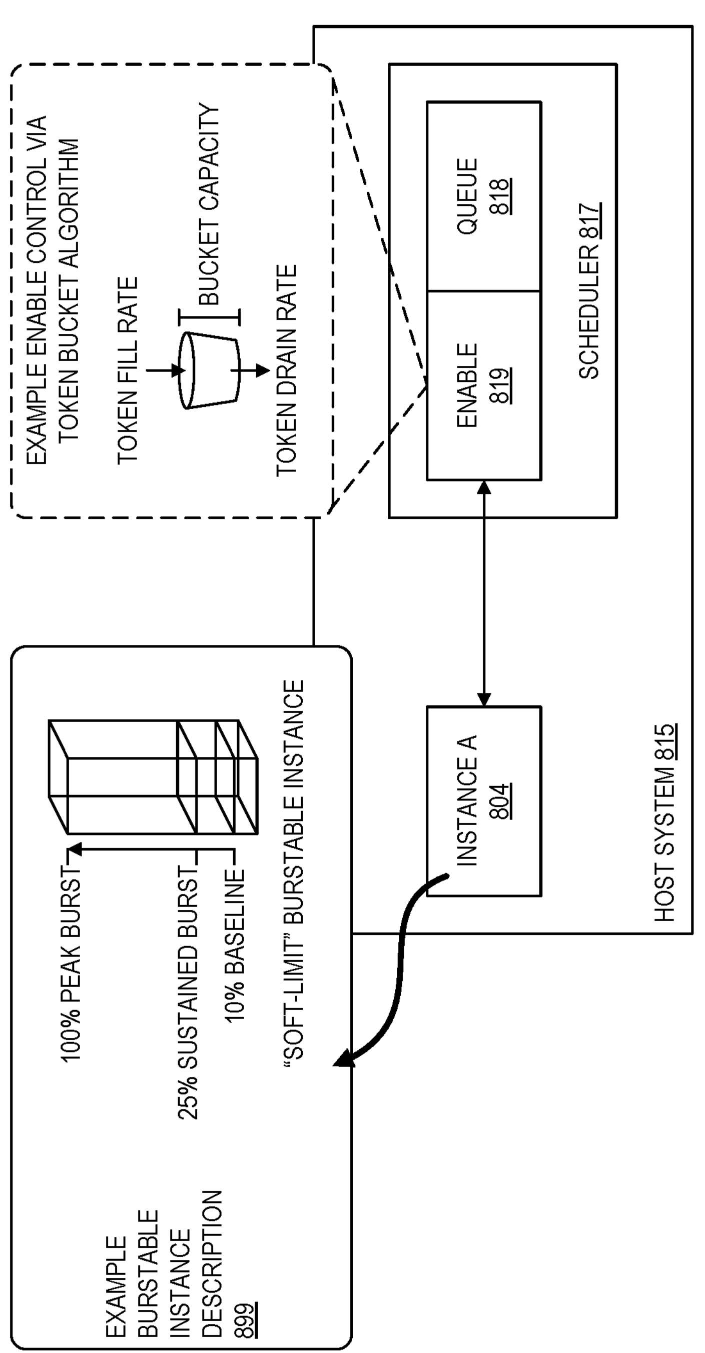
FIG. 8 is a diagram illustrating additional aspects of burstable performance instance prioritization by a scheduler of a host system according to some examples.

FIG. 8 is a diagram illustrating additional aspects of burstable performance instance prioritization by a scheduler of a host system according to some examples. As suggested by the example burstable instance sizes 199 in FIG. 1, some burstable instance sizes might have a limit placed on their burst performance level that is below 100% of a vCPU. For example, the "small" size in examples 199 has a 25% burst performance level. When two, different-sized instances share the same underlying physical compute resource, such a limit can prevent the smaller instance from blocking the larger instance's access to that resource.

While a "hard" limit on the burst performance level is possible, in some cases a "soft" limit that allows the instance to burst up to 100% utilization for a short period of time may be desirable (e.g., for instances that spend significant time operating below their baseline performance level.) Example burstable instance description 899 shows one such instance. As illustrated, this "soft-limit" burstable instance has a baseline performance level, a sustained burst performance level that the instance can achieve indefinitely provided there is no contention, and a peak burst performance level that the instance can achieve for some finite amount of time.

Instance A 804 hosted by a host system 815 is one such burstable instance. To provide a soft-limit, a queue 818 of a scheduler 817 can have an associated enable 819 that can be used to create a soft-limit. The enable 819 may prevent requests from the instance 804 from being queued or cause the scheduler 818 to ignore enqueued entries when disabled. To control the soft-limit, the enable 819 can be implemented using a token bucket algorithm. Conceptually, a token bucket algorithm has a fill rate, a drain rate, and a capacity. The drain rate is a function of the instances demand (e.g., each time the scheduler 817 honors a compute allocation request, the bucket is drained by some amount). The fill rate can be based on the desired sustained burst level of the instance being limited and the drain rate. For example, if the drain rate is one token each time slice the scheduler schedules the instance, the fill rate can be a single token per four time slices to achieve a sustained ratio of 1 to 4 or 25%. The bucket capacity can be adjusted to determine a filled or partially filled bucket will take to empty to the steady state. For example, if the bucket has a capacity of 100 tokens with a drain rate of 1 token per time slice, the instance could burst up to 100% vCPU usage for approximately 133 time slices before reaching the steady state (i.e., a drain rate of 1 and a fill rate of 0.25 results in a loss of approximately 0.75/4 tokens per time slice, and 100 divided by ¾ is approximately 133). A token bucket can be implemented using a counter that can increment by the fill rate, decrement by the drain rate, and has some limit as the capacity (e.g., it will not roll over or under).

FIG. 9 is a flow diagram illustrating operations 900 of a method for burstable performance instance scheduling according to some examples. Some or all of the operations 900 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 900 are performed by a host computer system 114, the host system management service 120 and/or the scheduler (e.g., 717, 817) of the other figures.

The operations 900 include, at block 902, executing, by a host computer system of a provider network, a plurality of burstable performance compute instances, wherein at least two of the plurality of burstable performance compute instances have different sizes. The operations 900 further include, at block 904, obtaining, from the host computer system, compute capacity usage data, the compute capacity usage data including a first indication of a first compute capacity used by a first burstable performance compute instance of the plurality of burstable performance compute instances over a first period of time. The operations 900 further include, at block 906, calculating a first weight for the first burstable performance compute instance, wherein the first weight is inversely related to the first compute capacity. The operations 900 further include, at block 908, updating a scheduler of the host computer system with a plurality of process prioritization weights, the plurality of process prioritization weights including a first process prioritization weight that is based at least in part on the first weight. The operations 900 further include, at block 910, allocating, by the scheduler and over a second period of time, at least a first portion of a total compute capacity of the host computer system to the first burstable performance compute instance based at least in part on the first process prioritization weight.

Figure 10:
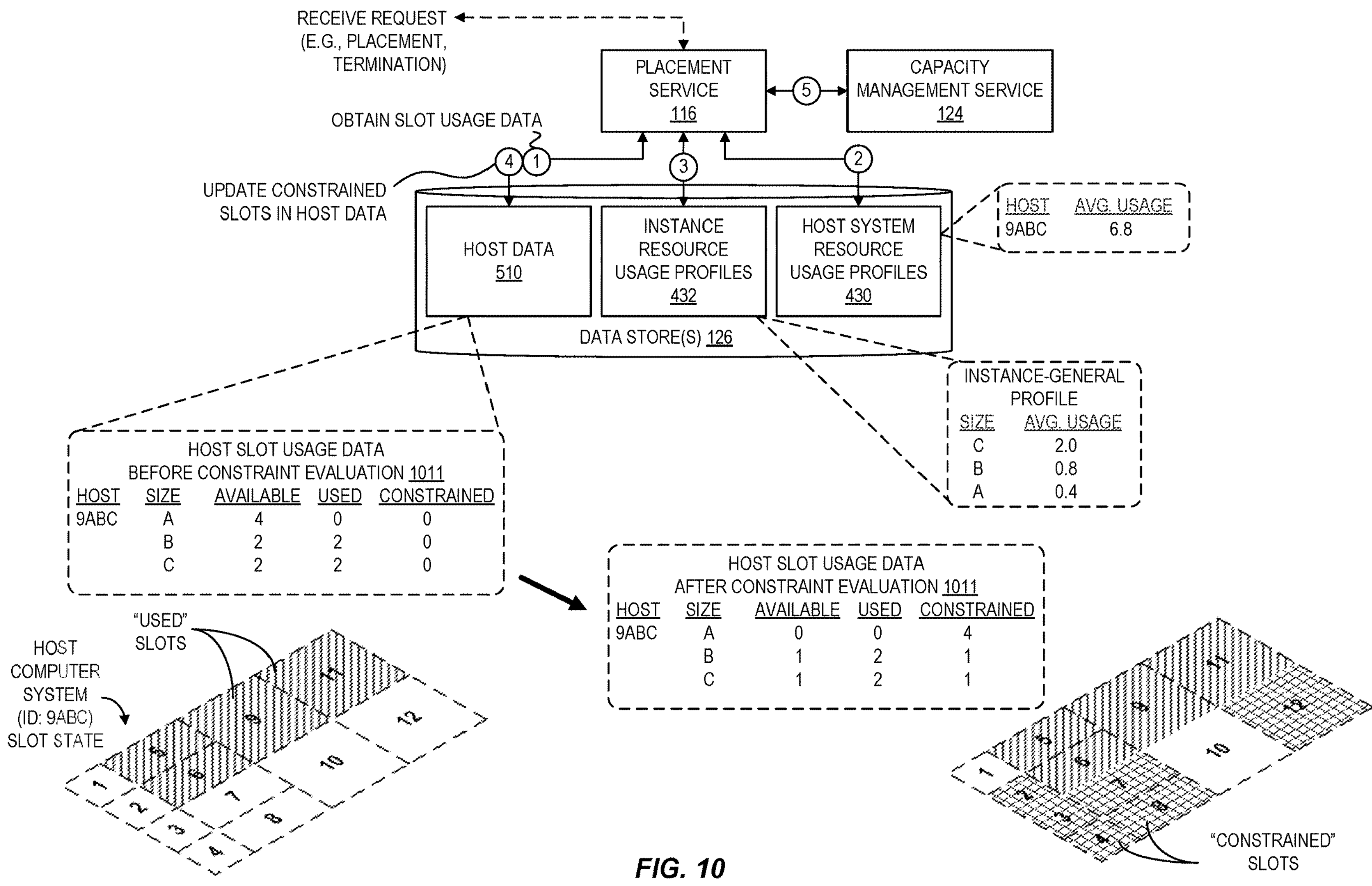
FIG. 10 is a diagram illustrating aspects of host system heat management with burstable performance instances according to some examples.

FIG. 10 is a diagram illustrating aspects of host system heat management with burstable performance instances according to some examples. To protect some amount of headroom that allows burstable instances to operate above their baseline performance level, the placement service 116 can introduce a new slot status-"constrained." As indicated above, slots can be marked as "available" or "used." Other slot statuses may exist, too, such as "blocked," which may be used in the case of a hardware failure, for example. The placement service 116 can mark slots as "constrained" to reflect heat-based limitations that are typically temporary (e.g., until another remedial measure such as live migration or re-balancing can lower resource utilization on the host system). Constraining a slot can prevent or limit placement of an instance in that slot, effectively reserving the resources that would be allocated to an instance placed in that slot as additional headroom for other instances already hosted on the host system. While constraining slots can improve individual burstable compute instance performance, it is not without costs, as overall fleet utilization can be reduced.

The placement service 116 can evaluate whether one or more slots on a given host system should be constrained as part of servicing various requests or as an independent workflow. For example, the placement service 116 can check whether to constrain slots on a host system during placement operations (illustrated and described at least with reference to FIG. 5). As another example, the placement service 116 can re-evaluate previously constrained slots on a host system upon receiving an indication that an instance was terminated (e.g., from the hardware virtualization service 112) resulting in a previously "used" slot becoming "available." As another example, the placement service 116 can periodically cycle through the various host systems and add or remove slot constraints independent of any received requests as part of a workflow separate from inbound requests.

An example set of operations by the placement service 116 to identify slots to be constrained and to update the host data 510 accordingly is now described. At a high level, these example operations detail the placement service 116 determining whether a difference between an actual or predicted compute resource usage (or utilization) of the host computer system and the total baseline compute performance level is below various thresholds and constraining slots accordingly. In this example, three burstable instance sizes—"A," "B," and "C"—are referenced. Size A has a 10% performance baseline and four vCPU allocation, size B has a 20% performance baseline and four vCPU allocation, and size C has a 40% performance baseline and four vCPU allocation. Thus, the baseline vCPU allocation of size A, B, and C burstable instances is 0.4 for size A, 0.8 for size B, and 1.6 for size C.

As indicated at circle 1, the placement service 116 can obtain slot usage data from the host data 510 for a particular host system, in this case, host system 9ABC. The initial host slot usage data 1011 reflects slot status on host system 9ABC before the placement service 116 evaluates whether to impose constraints. As shown in data 1011 and as graphically depicted, the host system 9ABC has four available slots for size A instances, two used and two available slots for size B instances, and two used and two available slots for size C instances.

As indicated at circle 2, the placement service 116 can obtain an indication of the actual compute capacity usage on host system 9ABC from the host system resource usage profiles 430. The actual compute capacity usage, sometimes referred to as the compute resource utilization, can refer to the aggregate compute capacity usage of each hosted instance. The actual compute usage can be a statistic, such as a total average compute usage of the instances in each used slot over some period of time. As shown, the actual compute usage for host system 9ABC is 6.8 vCPUs. Meanwhile, the expected compute usage would be 4.8 vCPUs (3.2 vCPUs for the used size C slots and 1.6 vCPUs for the used size B slots). Thus, the actual compute usage is higher than expected, indicating the instances placed onto host system 9ABC are using more compute resources than expected.

The placement service 116 can also obtain the baseline capacity requirement for all of the instances slotted within the template associated with the host 9ABC (e.g., by calculating it, by obtaining it from the host data 510). For example, the total baseline capacity required for four of each of burstable instance sizes A, B, and C is 9.6 vCPUs (4*(0.4 vCPUs+0.8 vCPUs+1.2 vCPUs)).

Using the actual compute capacity usage and the total baseline capacity, the placement service 116 can estimate the amount of headroom available on a host system such as host system 9ABC. Here, that headroom is 2.8 vCPUs (9.6 vCPUs-6.8 vCPUs).

In some examples, the placement service 116 can estimate the amount of headroom available on a host system based on predicted compute capacity usage data and the total baseline capacity. For example, the placement service 116 can obtain, per-instance, actual compute usage data (e.g., from host system resource usage profiles 430) and estimated compute usage data (e.g., from instance resource usage profiles 432). For each instance, the placement service 116 can select the higher of the two values to overestimate instances that might be going through a brief period of inactivity while respecting the actual usage of instances exceeding their expected usage. As another example, the instance resource usage profiles 432 may have time-based profiles (e.g., instance X uses Y compute capacity between times t1 and t2, Z compute capacity between times t2 and t3, etc.) The placement service can obtain available time-based estimated compute usage data for one or more hosted instances for an upcoming time period, if available, and use actual compute usage data or estimated compute usage data for compute usage for other instances. In these examples, the placement service 116 can "predict" what the headroom will be in the near future based on a difference between the predicted compute capacity usage data and the total baseline capacity.

Despite host system 9ABC having available slots, placing additional instances on it would negatively impact the ability of instances to burst by reducing that headroom. To prevent or delay that from happening, the placement service 116 can evaluate whether to constrain certain slots based at least in part on whether the estimated amount of available headroom is below some threshold. Various thresholds can be used to adjust the fleet utilization versus instance performance trade-off. An exemplary threshold is the baseline compute performance of various burstable performance compute instance sizes. In such a case, the placement service 116 can evaluate slots to determine whether an instance of the correspond size would fit within the estimated headroom. The placement service 116 can base the evaluation on the baseline or the actual instance usage profiles of the corresponding instance size.

The placement service 116 can evaluate whether to constrain remaining slots from repeating from small to large, repeating from large to small, exhausting sizes in some order, snaking from small to large (e.g., small, medium, large, small, . . . ), or snaking from large to small (e.g., large, medium, small, large, . . . ). In some examples, the evaluation order of slots to constrain is based on pool targets received from the capacity management service 124 as described below. In some examples, the evaluation order of slots to constrain is based on pool health (e.g., constraining slots with a higher number of available slots in the slot pool before constraining slots with a lower number of available slots in that slot pool).

For example, if the placement service 116 bases the evaluation on the baseline performance level for each instance size and repeats from small to large:

2.8 headroom−0.4 baseline for size A=2.4 (one A fits)
2.4 headroom−0.8 baseline for size B=1.6 (one B fits)
1.6 headroom−1.6 baseline for size C=0.0 (one C fits)
(no additional headroom, all remaining slots constrained).

As another example, if the placement service 116 bases the evaluation on the instance usage profiles (e.g., in instance resource usage profiles 432) repeats from large to small:

2.8 headroom−2.0 average usage for size C=0.8 (one C fits)
0.8 headroom−0.8 average usage for size B=0.8 (one B fits)
(no additional headroom, all remaining slots constrained).

The updates to the host slot usage data 1011 after constraints are evaluated according to this second example are illustrated. As can be seen, one of the available size C slots was constrained, one of the available size B slots was constrained, and all four of the available size A slots were constrained.

The removal of constraints can proceed similar to the above. For example, if an instance of size C contributing 3.2 to the actual compute usage of host 9ABC was terminated, the updated actual compute usage of host 9ABC would be 3.6. The evaluation of unused slots (whether available or constrained) can proceed as described above with a starting headroom of 6.0 (e.g., 9.6−3.6). For example: if the placement service 116 bases the evaluation on the baseline performance level for each instance size and repeats from small to large:

6.0 headroom−0.4 baseline for size A=5.6 (one A fits)
5.6 headroom−0.8 baseline for size B=4.8 (one B fits)
4.8 headroom−1.6 baseline for size C=3.2 (one C fits)
3.2 headroom−0.4 baseline for size A=2.8 (second A fits)
2.8 headroom−0.8 baseline for size B=2.0 (second B fits)
2.0 headroom−1.6 baseline for size C=0.4 (second C fits)
0.4 headroom−0.4 baseline for size A=0.0 (third A fits)
(no additional headroom, all remaining slots constrained).

Note that in examples that employ constrained slots, the behavior of the placement service 116 during placement operations such as described above with reference to FIG. 5 can be affected. For example, the placement service 116 can initially ignore constrained slots when identifying candidates. That is, a "constrained" slot status prevents or otherwise blocks the placement service 116 from suggesting use of the slot when providing candidates in response to a placement request. In some examples, however, if the available slots that can satisfy a request become exhausted, the placement service 116 may make candidate selections based on constrained slots.

As indicated at circle 5, the placement service 116 can signal constraint changes to slots (e.g., whether from available to constrained, whether from constrained to available) to the capacity management service 124.

In some examples, a scaling factor is introduced when evaluating whether to constrain slots. The scaling factor can be used to adjust the threshold, such as by scaling the amount of baseline capacity an instance of a particular type and size would consume. For example, a scaling factor of 0.75 could adjust the baseline capacity downward, reducing the number of constrained slots resulting in increased utilization and potentially decreasing the amount of headroom for burst performance. Taking the example above where the placement service 116 evaluates slots from small to large but with a 0.5 scale factor:

2.8 headroom−0.75*0.4 baseline for size A=2.5 (one A fits)
2.5 headroom−0.75*0.8 baseline for size B=1.9 (one B fits)
1.9 headroom−0.75*1.6 baseline for size C=0.7 (one C fits)
0.7 headroom−0.75*0.4 baseline for size A=0.4 (second A fits)
0.4 headroom−0.75*0.8 baseline for size B=−0.2 (second B does not fit)
(no additional headroom, all remaining slots constrained).

Conversely, a scaling factor of 1.1 could adjust the baseline capacity upward, increasing the number of constrained slots resulting in decreased utilization and increased headroom being preserved for burst performance. By adjusting the scale factor, the cloud provider network operator can make a trade-off between overall fleet capacity utilization and the headroom, or burst performance capacity, of burstable performance compute instances hosted by the fleet.

In some examples, the placement service 116 can constrain one or more slots on a given host system based on predicted peak burst utilization. For example, the placement service 116 can obtain the historical or a predicted peak burst for each of the hosted burstable performance instances from the instance usage profiles data 432. The placement service 116 can sum the peak burst for each instance and compare whether that total is greater than some threshold above the total vCPU capacity of the associated host system, optionally adjusted by a scale factor. If the predicted peak burst exceeds the threshold, the placement service 116 can constrain one or more, or even all, of the remaining available slots.

Figure 11:
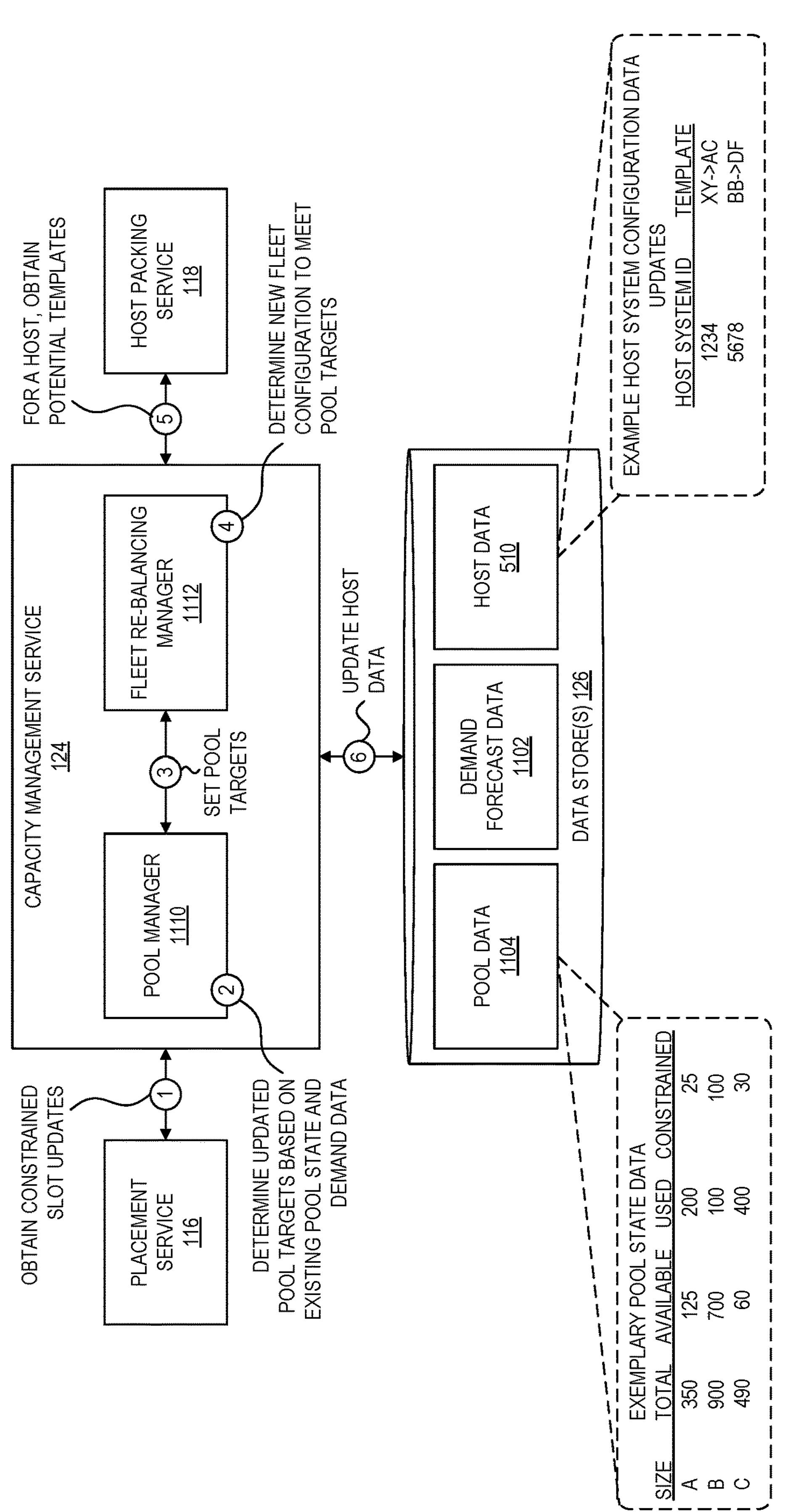
FIG. 11 is a diagram illustrating aspects of host system fleet management with burstable performance instances according to some examples.

FIG. 11 is a diagram illustrating aspects of host system fleet management with burstable performance instances according to some examples. Customer demand for different types and sizes of compute instances can change over time. Such demand fluctuations can be hourly, daily, weekly, monthly, seasonally, etc. The cloud provider network can build demand forecast data 1102 based on previously observed demand patterns. Such demand forecast data 1102 can be assembled per instance type and size, with each forecast having multiple degrees of confidence. For example, the demand forecast data 1102 for a "small" burstable instance might indicate that in the next hour, the cloud provider network can expect at least 100 launches with 95% confidence, at least 90 launches with 90% confidence, at least 83 launches with 85% confidence, and so on. The capacity management service 124 uses this demand forecast data 1102 to re-shape or re-balance the unused portion of the host system fleet to attempt to prepare for incoming demand (e.g., by changing templates associated with the host systems).

As indicated at circle 1, the capacity management service 124 obtains constrained slot updates from the placement service 116. A pool manager 1110 of the capacity management service 124 can update pool data 1104 based on the obtained updates. Exemplary pool data can be used to track, for each instance type and size combination, the total number of slots in the current fleet configuration and their status. In this context, the fleet configuration refers to the host systems and their associated templates. In other examples, the pool manager 1110 can construct pool data 1104 based on host data 510, which can include, for each host system, the associated template and slot usage data. For example, if fifty host systems are associated with template "FED," and template "FED" has ten "small" size burstable instance slots, the small burstable instance pool is 500 slots. Note that other types and sizes of instances can and likely are present in pool state data, but the example here is limited to burstable instances of three different types for simplicity.

The pool manager 1110 determines the total unused capacity in the fleet based on both available and constrained slots. Such a determination may be in the form of an estimate. For example, the pool manager 1110 can, for each instance type and size, multiply the total number of constrained and available slots by an associated resource vector to get an estimate of the unused capacity currently allocated to that instance type and size. Then, the pool manager 1110 can sum all of the unused capacity currently allocated across instance types and sizes to get a total unused capacity in the fleet. Using the example pool state data, if instance size A has a baseline performance level of 0.4 vCPUs, instance size B has a baseline performance level of 0.8 vCPUs, and instance size C has a baseline performance level of 1.6 vCPUs, the total unused capacity would be 844 vCPUs ((for type A: 125 available slots+25 constrained slots)*0.4 vCPUs/slot+ (for type B: 700 available slots+100 constrained slots)*0.8 vCPUs/slot+ (for type C: 60 available slots+30 constrained slots)*1.6 vCPUs/slot). In other examples, the pool manager 1110 can calculate the total unused capacity based on actual instance resource usage profiles 432 (not shown) by multiplying the actual instance resource usage profile for a given type by the total number of used slots for that type, summing all of the resulting values for each type, and subtracting that amount from the total fleet capacity. Note that constrained slots are considered part of unused capacity despite as some of those "constrained" resources can be freed up by adjusting the template associated with the host system as part of re-balancing operations.

The pool manager 1110 can also determine the ratio of constrained to used slots per pool. For example, pool type A has a 8:1 ratio (i.e., 200:25), pool type B has a 1:1 ratio, and pool type C has a 40:3 ratio.

As part of re-balancing, the pool manager 1110 determines updated pool targets based on the demand forecast data 1102 and the total available capacity, as indicated at circle 2. For example, the pool manager 1110 can determine whether the expected minimum launch number for each instance type at 95% confidence will fit within the total available capacity. As part of that determination, the pool manager 1110 can, for each pool, adjust the expected launch number by the ratio of constrained slots for that pool. For example, if the expected launch number for instance type A is 50, the pool manager 1110 can adjust that value by the 8:1 ratio to determine that those 50 launches will likely consume ~56 type A slots. The adjusted expected launch numbers for each pool can be multiplied by the corresponding resource vector for that pool, summed over the pools, and compared against the total unused capacity. If the total capacity required to satisfy the 95% confidence launch number as adjusted by expected constraints is less than the total unused capacity, the pool manager 1110 can set those adjusted launch numbers as the new pool targets for re-balancing. If the total capacity required to satisfy the 95% confidence launch number as adjusted by expected constraints is greater than the total unused capacity, the pool manager 1110 can move to the next available confidence. That is, the pool manager 1110 can determine whether the expected minimum launch number for each instance type at 90% confidence can fit within the total available capacity, as described above.

As indicated at circle 3, the pool manager 1110 sends the updated pool targets with the fleet re-balancing manager 1112. At a high level, the fleet re-balancing manager 1112 evaluates potential changes to templates associated with host systems to alter the number of slots per instance type based on the updated pool targets. For example, if the updated pool targets are 150, 600, and 65 for instance sizes A, B, and C, respectively, the fleet re-balancing manager will attempt to shift resource allocations via slots to create 25 size A slots (above the 125 that are available), remove 100 size B slots (below the 700 that are available), and create 5 size C slots (above the 60 that are available).

As indicated at circle 4, the fleet re-balancing manager 1112 determines a new fleet configuration to meet the updated pool targets. To do so, the fleet re-balancing manager 1112 can iterate over existing host systems and attempt to change the associated template ("re-templating"). As indicated at circle 5, the fleet re-balancing manager 1112 can request a set of candidate templates from the host packing service 118. The request can include various constraints, including that the candidate template(s) must include slots of the type corresponding to the used slot(s), if any, in the previous template (to leave those instances undisturbed) and whether to omit or prioritize certain slots in the candidates based on pool targets (e.g., omit slots of size B given pool target requires 100 fewer size B slots, prioritize slots of size A given pool target requires 25 additional size A slots).

In some examples, the fleet re-balancing manager 1112 prioritizes re-templating host systems based on their usage profiles. Host systems with lower usage typically have fewer used slots, allowing for more degrees of freedom in the candidate template(s).

In some cases, the host packing service 118 cannot satisfy a request as no candidate template can satisfy the constraints. In such a case, the fleet re-balancing manager 1112 moves on to the next host system. The fleet re-balancing manager 1112 continues to identify host system template changes until the pool targets are satisfied. In view of the existing template configuration of host systems of the fleet, the set of template changes represents a new fleet configuration. As indicated at circle 6, the fleet re-balancing manager 1112 updates the host data 510 to update the template association of host systems affected by the re-balance. As part of updating the template associated with a given host system, the fleet re-balancing manager 1112 can clear any previously constrained slots.

In some examples, the fleet re-balancing manager 1112 will update the placement service 116 with the per-pool estimated slot constraints based on the adjusted expected launch numbers of the forecast confidence for each pool that could be satisfied. For example, if the updated pool targets are 150, 600, and 65 for instance sizes A, B, and C, respectively, the un-adjusted numbers may have been 132 for size A with 18 slots expected to be constrained, 550 for size B with 50 slots expected to be constrained, and 59 for size C with 6 slots expected to be constrained).

The placement service 116 can use the per-pool adjustment amounts in evaluating which slots to prioritize for constraint. For example, if the relative sizes of A, B, and C are as illustrated in FIG. 10, the number of slots to constrain for size A would be 7.2 vCPUs (0.4 vCPUs*18 expected constrained slots), the number of slots to constrain for size B would be 40 vCPUs (0.8 vCPUs*50 expected constrained slots), and the number of slots to constrain for size C would be 9.6 (1.6 vCPUs*6 expected constrained slots). In evaluating whether to constrain slots based on available headroom, the placement service 116 can begin with slots least-needing constraints (while headroom remains high) to increase the likelihood that the slots in pools with an expected larger number of constraints are constrained first. Continuing the above example, the placement service 116 could attempt to prevent constraining size A slots (expected 7.2 vCPUs of constraint) and size C (expected 9.6 vCPUs of constraint) slots over size B (expected 40 vCPUs of constraint).

Aspects of the above described components of the cloud provider network 100 supporting burstable instances provide a multi-layered, dynamic approach to heat management while improving the overall utilization of fleet computing resources. As described, the placement service 116 can intelligently distribute new burstable instances to divide expected workloads across the fleet. The placement service 116 can also impose temporary restrictions (e.g., constrained slots) on the use of host system resources when actual host system resource usage exceeds anticipated resource usage. The host packing service 118 can divvy up host system resources via templates in a manner to provide baseline performance levels that customers can expect while allowing unused capacity to be shared by other co-hosted burstable instances. The host system management service 120 provides for the prioritization of resources amongst burstable instances during times of resource contention in a manner that honors baseline performance levels. The live migration service 122 can re-distribute burstable instances when host systems become overheated despite the above heat management techniques. And the capacity management service 124 can re-shape the resource allocation of the fleet to meet anticipated customer demand while account for the dynamic resource consumption of burstable instances.

Figure 12:
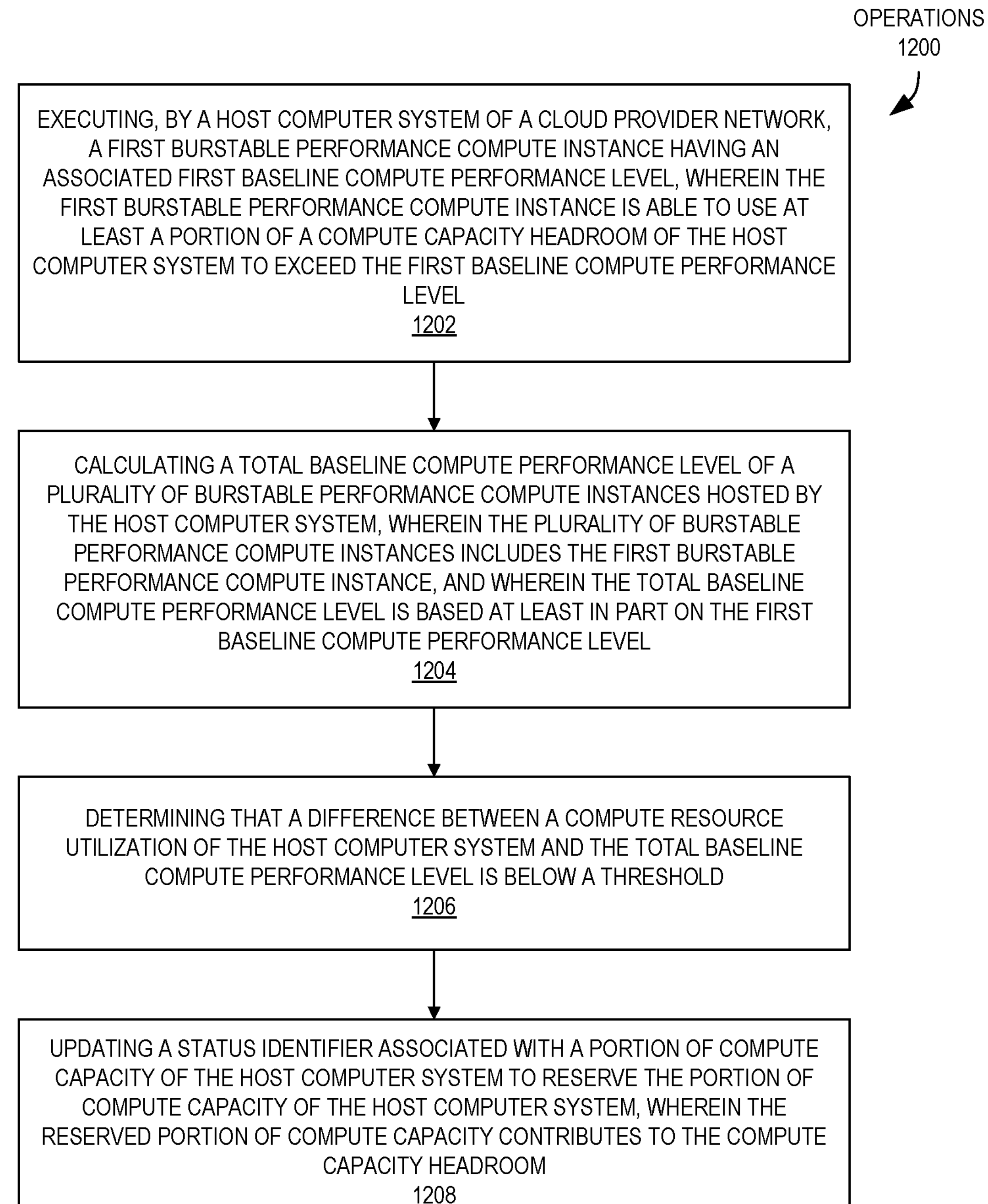
FIG. 12 is a flow diagram illustrating operations of a method for host system heat management according to some examples.

FIG. 12 is a flow diagram illustrating operations 1200 of a method for host system heat management according to some examples. Some or all of the operations 1200 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1200 are performed by a host computer system 114 and/or the placement service 116 of the other figures.

The operations 1200 include, at block 1202, executing, by a host computer system of a cloud provider network, a first burstable performance compute instance having an associated first baseline compute performance level, wherein the first burstable performance compute instance is able to use at least a portion of a compute capacity headroom of the host computer system to exceed the first baseline compute performance level. The operations 1200 further include, at block 1204, calculating a total baseline compute performance level of a plurality of burstable performance compute instances hosted by the host computer system, wherein the plurality of burstable performance compute instances includes the first burstable performance compute instance, and wherein the total baseline compute performance level is based at least in part on the first baseline compute performance level. The operations 1200 further include, at block 1206, determining that a difference between a compute resource utilization of the host computer system and the total baseline compute performance level is below a threshold. The operations 1200 further include, at block 1208, updating a status identifier associated with a portion of compute capacity of the host computer system to reserve the portion of compute capacity of the host computer system, wherein the reserved portion of compute capacity contributes to the compute capacity headroom.

Figure 13:
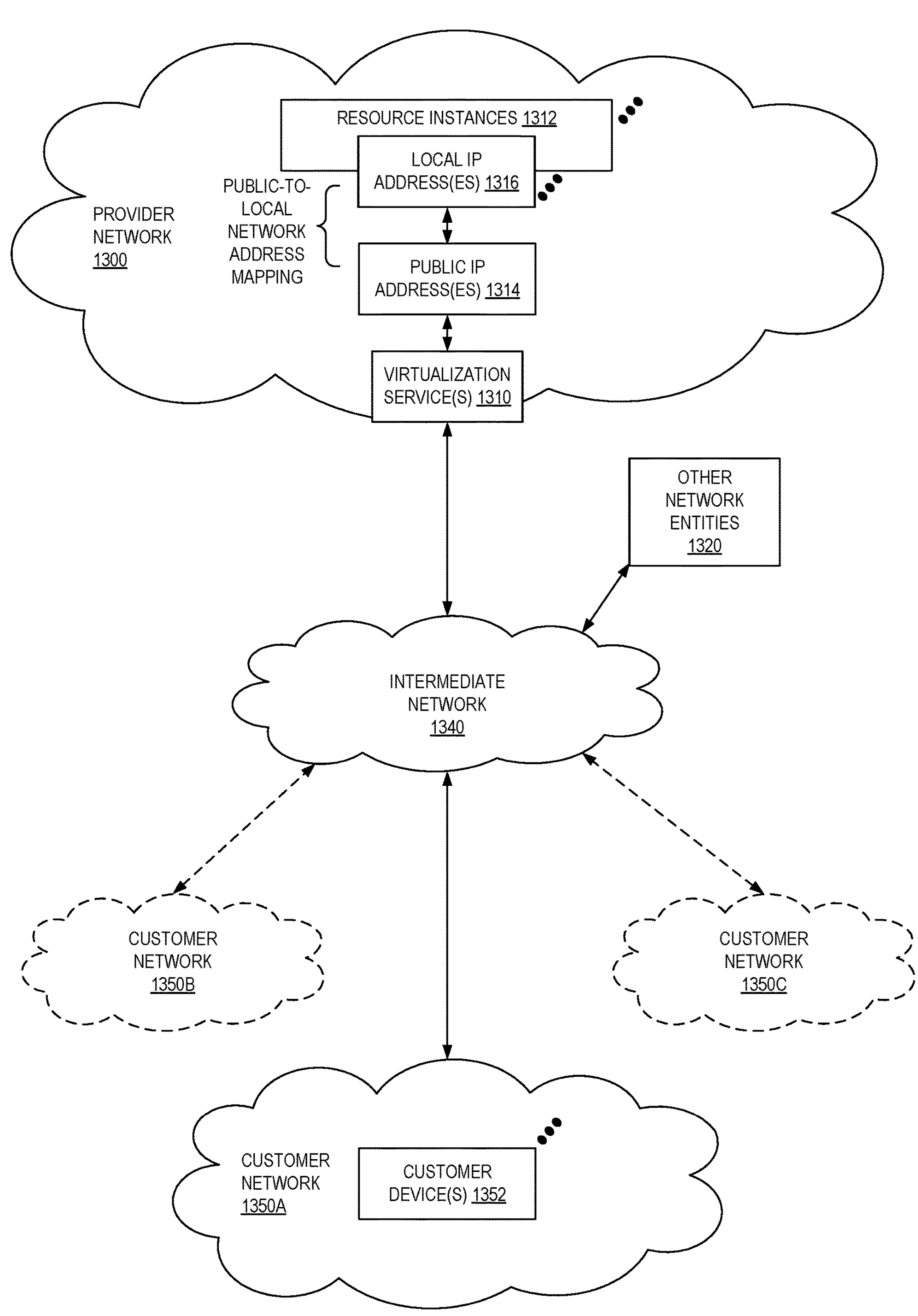
FIG. 13 illustrates an example provider network environment according to some examples.

FIG. 13 illustrates an example provider network (or "service provider system") environment according to some examples. A provider network 1300 can provide resource virtualization to customers via one or more virtualization services 1310 that allow customers to purchase, rent, or otherwise obtain instances 1312 of virtualized resources, including but not limited to computation and storage resources, implemented on devices within the provider network or networks in one or more data centers. Local Internet Protocol (IP) addresses 1316 can be associated with the resource instances 1312; the local IP addresses are the internal network addresses of the resource instances 1312 on the provider network 1300. In some examples, the provider network 1300 can also provide public IP addresses 1314 and/or public IP address ranges (e.g., Internet Protocol version 4 (IPv4) or Internet Protocol version 6 (IPv6) addresses) that customers can obtain from the provider 1300.

Conventionally, the provider network 1300, via the virtualization services 1310, can allow a customer of the service provider (e.g., a customer that operates one or more customer networks 1350A-1350C (or "client networks") including one or more customer device(s) 1352) to dynamically associate at least some public IP addresses 1314 assigned or allocated to the customer with particular resource instances 1312 assigned to the customer. The provider network 1300 can also allow the customer to remap a public IP address 1314, previously mapped to one virtualized computing resource instance 1312 allocated to the customer, to another virtualized computing resource instance 1312 that is also allocated to the customer. Using the virtualized computing resource instances 1312 and public IP addresses 1314 provided by the service provider, a customer of the service provider such as the operator of the customer network(s) 1350A-1350C can, for example, implement customer-specific applications and present the customer's applications on an intermediate network 1340, such as the Internet. Other network entities 1320 on the intermediate network 1340 can then generate traffic to a destination public IP address 1314 published by the customer network(s) 1350A-1350C; the traffic is routed to the service provider data center, and at the data center is routed, via a network substrate, to the local IP address 1316 of the virtualized computing resource instance 1312 currently mapped to the destination public IP address 1314. Similarly, response traffic from the virtualized computing resource instance 1312 can be routed via the network substrate back onto the intermediate network 1340 to the source entity 1320.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1300; a customer can then assign their allocated public IP addresses to particular resource instances allocated to the customer. These public IP addresses can be referred to as customer public IP addresses, or simply customer IP addresses. Instead of being assigned by the provider network 1300 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 14:
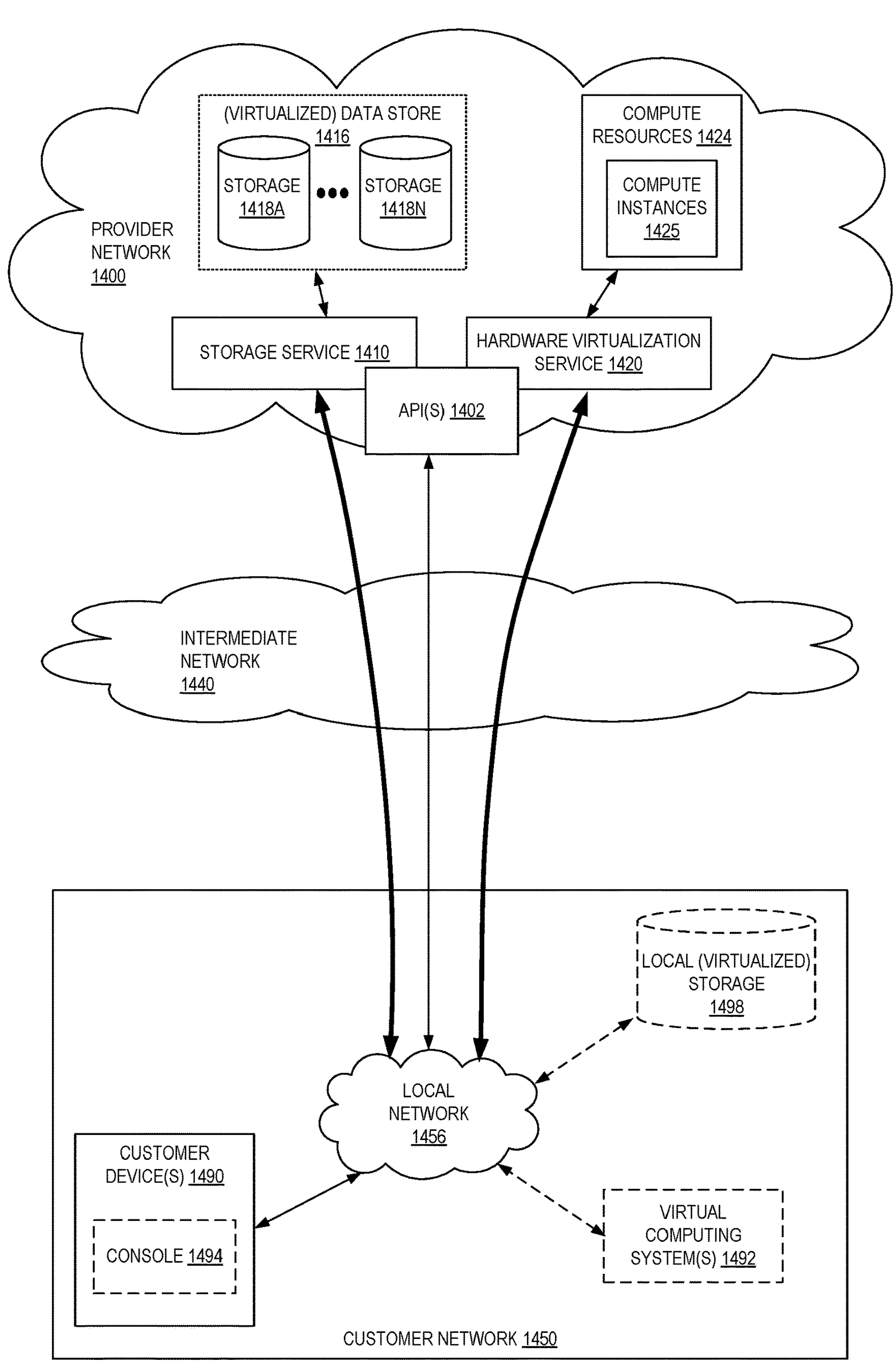
FIG. 14 is a block diagram of an example provider network that provides a storage service and a hardware virtualization service to customers according to some examples.

FIG. 14 is a block diagram of an example provider network environment that provides a storage service and a hardware virtualization service to customers, according to some examples. A hardware virtualization service 1420 provides multiple compute resources 1424 (e.g., compute instances 1425, such as VMs) to customers. The compute resources 1424 can, for example, be provided as a service to customers of a provider network 1400 (e.g., to a customer that implements a customer network 1450). Each computation resource 1424 can be provided with one or more local IP addresses. The provider network 1400 can be configured to route packets from the local IP addresses of the compute resources 1424 to public Internet destinations, and from public Internet sources to the local IP addresses of the compute resources 1424.

The provider network 1400 can provide the customer network 1450, for example coupled to an intermediate network 1440 via a local network 1456, the ability to implement virtual computing systems 1492 via the hardware virtualization service 1420 coupled to the intermediate network 1440 and to the provider network 1400. In some examples, the hardware virtualization service 1420 can provide one or more APIs 1402, for example a web services interface, via which the customer network 1450 can access functionality provided by the hardware virtualization service 1420, for example via a console 1494 (e.g., a web-based application, standalone application, mobile application, etc.) of a customer device 1490. In some examples, at the provider network 1400, each virtual computing system 1492 at the customer network 1450 can correspond to a computation resource 1424 that is leased, rented, or otherwise provided to the customer network 1450.

From an instance of the virtual computing system(s) 1492 and/or another customer device 1490 (e.g., via console 1494), the customer can access the functionality of a storage service 1410, for example via the one or more APIs 1402, to access data from and store data to storage resources 1418A-1418N of a virtual data store 1416 (e.g., a folder or "bucket," a virtualized volume, a database, etc.) provided by the provider network 1400. In some examples, a virtualized data store gateway (not shown) can be provided at the customer network 1450 that can locally cache at least some data, for example frequently accessed or critical data, and that can communicate with the storage service 1410 via one or more communications channels to upload new or modified data from a local cache so that the primary store of data (the virtualized data store 1416) is maintained. In some examples, a user, via the virtual computing system 1492 and/or another customer device 1490, can mount and access virtual data store 1416 volumes via the storage service 1410 acting as a storage virtualization service, and these volumes can appear to the user as local (virtualized) storage 1498.

While not shown in FIG. 14, the virtualization service(s) can also be accessed from resource instances within the provider network 1400 via the API(s) 1402. For example, a customer, appliance service provider, or other entity can access a virtualization service from within a respective virtual network on the provider network 1400 via the API(s) 1402 to request allocation of one or more resource instances within the virtual network or within another virtual network.

Illustrative Systems

Figure 15:
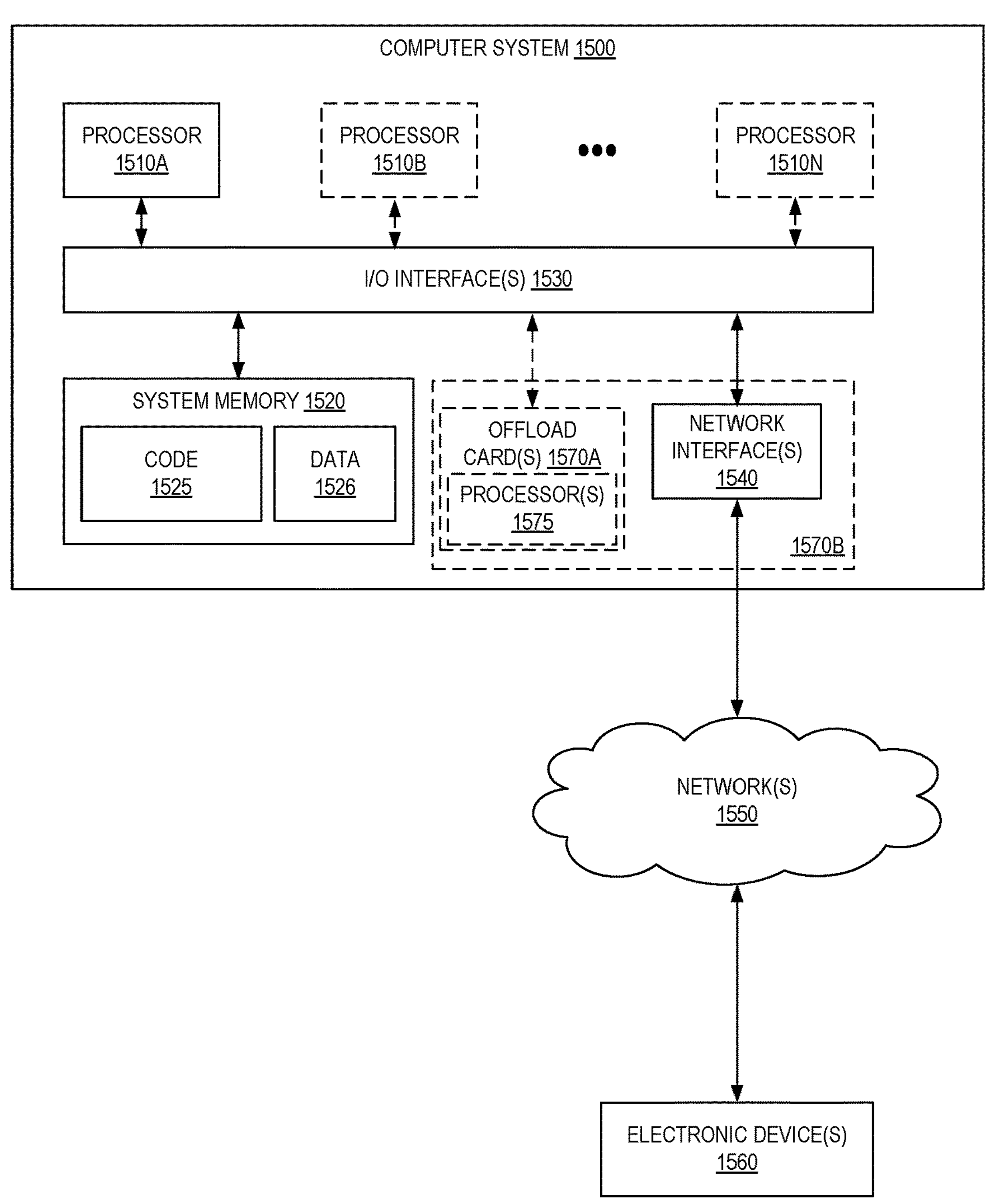
FIG. 15 is a block diagram illustrating an example computer system that can be used in some examples.

In some examples, a system that implements a portion or all of the techniques described herein can include a general-purpose computer system, such as the computer system 1500 illustrated in FIG. 15, that includes, or is configured to access, one or more computer-accessible media. In the illustrated example, the computer system 1500 includes one or more processors 1510 coupled to a system memory 1520 via an input/output (I/O) interface 1530. The computer system 1500 further includes a network interface 1540 coupled to the I/O interface 1530. While FIG. 15 shows the computer system 1500 as a single computing device, in various examples the computer system 1500 can include one computing device or any number of computing devices configured to work together as a single computer system 1500.

In various examples, the computer system 1500 can be a uniprocessor system including one processor 1510, or a multiprocessor system including several processors 1510 (e.g., two, four, eight, or another suitable number). The processor(s) 1510 can be any suitable processor(s) capable of executing instructions. For example, in various examples, the processor(s) 1510 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1510 can commonly, but not necessarily, implement the same ISA.

The system memory 1520 can store instructions and data accessible by the processor(s) 1510. In various examples, the system memory 1520 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1520 as code 1525 (e.g., executable to implement, in whole or in part, the hardware virtualization service 112, the placement service 116, the host packing service 118, the host system management service 120, the live migration service 122, and/or the capacity management service 124) and data 1526.

In some examples, the I/O interface 1530 can be configured to coordinate I/O traffic between the processor 1510, the system memory 1520, and any peripheral devices in the device, including the network interface 1540 and/or other peripheral interfaces (not shown). In some examples, the I/O interface 1530 can perform any necessary protocol, timing, or other data transformations to convert data signals from one component (e.g., the system memory 1520) into a format suitable for use by another component (e.g., the processor 1510). In some examples, the I/O interface 1530 can include support for devices attached through various types of peripheral buses, such as a variant of the Peripheral Component Interconnect (PCI) bus standard or the Universal Serial Bus (USB) standard, for example. In some examples, the function of the I/O interface 1530 can be split into two or more separate components, such as a north bridge and a south bridge, for example. Also, in some examples, some or all of the functionality of the I/O interface 1530, such as an interface to the system memory 1520, can be incorporated directly into the processor 1510.

The network interface 1540 can be configured to allow data to be exchanged between the computer system 1500 and other devices 1560 attached to a network or networks 1550, such as other computer systems or devices as illustrated in FIG. 1, for example. In various examples, the network interface 1540 can support communication via any suitable wired or wireless general data networks, such as types of Ethernet network, for example. Additionally, the network interface 1540 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1500 includes one or more offload cards 1570A or 1570B (including one or more processors 1575, and possibly including the one or more network interfaces 1540) that are connected using the I/O interface 1530 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1500 can act as a host electronic device (e.g., operating as part of a hardware virtualization service) that hosts compute resources such as compute instances, and the one or more offload cards 1570A or 1570B execute a virtualization manager that can manage compute instances that execute on the host electronic device. As an example, in some examples the offload card(s) 1570A or 1570B can perform compute instance management operations, such as pausing and/or un-pausing compute instances, launching and/or terminating compute instances, performing memory transfer/copying operations, etc. These management operations can, in some examples, be performed by the offload card(s) 1570A or 1570B in coordination with a hypervisor (e.g., upon a request from a hypervisor) that is executed by the other processors 1510A-1510N of the computer system 1500. However, in some examples the virtualization manager implemented by the offload card(s) 1570A or 1570B can accommodate requests from other entities (e.g., from compute instances themselves), and cannot coordinate with (or service) any separate hypervisor.

In some examples, the system memory 1520 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1500 via the I/O interface 1530. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1500 as the system memory 1520 or another type of memory. Further, a computer-accessible medium can include transmission media or signals such as electrical, electromagnetic, or digital signals, conveyed via a communication medium such as a network and/or a wireless link, such as can be implemented via the network interface 1540.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters or numbers (e.g., 1418A-1418N, 115-1 to 115-N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

executing, by a host computer system of a cloud provider network, a first burstable performance compute instance having an associated first baseline compute performance level, wherein the first burstable performance compute instance is a first type of a plurality of available burstable performance compute instance types, each of the plurality of available burstable performance compute instance types being associated with a respective baseline compute performance level and burst capacity, wherein the first burstable performance compute instance is able to use at least a portion of a compute capacity headroom of the host computer system to exceed the first baseline compute performance level, wherein the first baseline compute performance level is based at least in part on a percentage utilization of a virtual processor, wherein a virtual processor corresponds to at least one of a core of a processor of the host computer system or a hyper-thread of a processor of the host computer system, and wherein a template comprising a plurality of slots is associated with the host computer system, each slot of the plurality of slots associated with a portion of a total compute compacity of the host computer system;

determining a total baseline capacity requirement associated with the host computer system, the total baseline capacity requirement to include the first baseline compute performance level;

determining a compute resource utilization of a plurality of burstable performance compute instances hosted by the host computer system, wherein the plurality of burstable performance compute instances includes the first burstable performance compute instance;

determining that a difference between the compute resource utilization and the total baseline capacity requirement is below a threshold;

updating a status identifier associated with a slot of a plurality of slots associated with the host computer system, each slot of the plurality of slots associated with at least one of the portions of a total compute capacity of the host computer system, the status identifier constraining the slot to prevent or limit placement of an instance in the slot to reserve the portion of the total compute capacity of the host computer system associated with the slot as additional headroom for other instances already hosted on the host computer system, wherein the reserved portion of compute capacity contributes to the compute capacity headroom; and wherein the status identifier is associated with a slot of the plurality of slots.

2. The computer-implemented method of claim 1, wherein the threshold is based at least in part on a scale factor to adjust an overall compute resource utilization of a plurality of host computer systems of the cloud provider network.

3. The computer-implemented method of claim 1, wherein each slot of the plurality of slots is associated with one of the plurality of available burstable compute instance types, and wherein the total baseline capacity requirement is based at least in part on a sum of the baseline compute performance levels associated with the plurality of slots.

4. A computer-implemented method comprising:

executing, by a host computer system of a cloud provider network, a first burstable performance compute instance having an associated first baseline compute performance level, wherein the first burstable performance compute instance is able to use at least a portion of a compute capacity headroom of the host computer system to exceed the first baseline compute performance level;

determining a total baseline capacity requirement associated with the host computer system, the total baseline capacity requirement to include the first baseline compute performance level;

determining a compute resource utilization of a plurality of burstable performance compute instances hosted by the host computer system, wherein the plurality of burstable performance compute instances includes the first burstable performance compute instance;

determining that a difference between the compute resource utilization and the total baseline capacity requirement is below a threshold; and updating a status identifier associated with a slot of a plurality of slots associated with the host computer system, each slot of the plurality of slots associated with a portion of a total compute capacity of the host computer system, the status identifier constraining the slot to prevent or limit placement of an instance in the slot to reserve the portion of the total compute capacity of the host computer system associated with the slot as additional headroom for other instances already hosted on the host computer system, wherein the reserved portion of compute capacity contributes to the compute capacity headroom.

5. The computer-implemented method of claim 4, wherein the threshold is based at least in part on a scale factor to adjust an overall compute resource utilization of a plurality of host computer systems of the cloud provider network.

6. The computer-implemented method of claim 4, wherein the total baseline capacity requirement is based at least in part on a sum of a baseline compute performance level associated with each burstable performance compute instance of the plurality of burstable performance compute instances.

7. The computer-implemented method of claim 4, wherein the first baseline compute performance level is based at least in part on a percentage utilization of a virtual processor.

8. The computer-implemented method of claim 7, wherein the virtual processor corresponds to at least one of a core of a processor of the host computer system or a hyper-thread of a processor of the host computer system.

9. The computer-implemented method of claim 4, further comprising:

obtaining, from the host computer system, an average utilization of a processor of the host computer system over a first period of time; and wherein the compute resource utilization of the host computer system is based at least in part on the average utilization.

10. The computer-implemented method of claim 4:

wherein a template comprising a plurality of slots is associated with the host computer system, each slot of the plurality of slots associated with a portion of a total compute capacity of the host computer system; and wherein the status identifier is associated with a slot of the plurality of slots.

11. The computer-implemented method of claim 10, wherein the updated status identifier associated with the slot prevents a launch of another burstable performance compute instance on the host computer system.

12. The computer-implemented method of claim 10, wherein the threshold is based at least in part on a baseline compute performance level associated with the slot.

13. The computer-implemented method of claim 4, wherein the compute resource utilization of the host computer system is a predicted compute resource utilization.

14. A system comprising:

a host computer system of a cloud provider network, the host computer system including instructions that upon execution cause the host computer system to:

execute a first burstable performance compute instance having an associated first baseline compute performance level, wherein the first burstable performance compute instance is able to use at least a portion of a compute capacity headroom of the host computer system to exceed the first baseline compute performance level;

a first one or more electronic devices to implement a service in the cloud provider network, the service including instructions that upon execution cause the service to:

determine a total baseline capacity requirement associated with the host computer system, the total baseline capacity requirement to include the first baseline compute performance level;

determine a compute resource utilization of a plurality of burstable performance compute instances hosted by the host computer system, wherein the plurality of burstable performance compute instances includes the first burstable performance compute instance;

determine that a difference between the compute resource utilization and the total baseline capacity requirement is below a threshold; and update a status identifier associated with a slot of a plurality of slots associated with the host computer system, each slot of the plurality of slots associated with a portion of a total compute capacity of the host computer system, the status identifier constraining the slot to prevent or limit placement of an instance in the slot to reserve the portion of the total compute capacity of the host computer system associated with the slot as additional headroom for other instances already hosted on the host computer system, wherein the reserved portion of compute capacity contributes to the compute capacity headroom.

15. The system of claim 14, wherein the threshold is based at least in part on a scale factor to adjust an overall compute resource utilization of a plurality of host computer systems of the cloud provider network.

16. The system of claim 14, wherein the total baseline capacity requirement is based at least in part on a sum of a baseline compute performance level associated with each burstable performance compute instance of the plurality of burstable performance compute instances.

17. The system of claim 14, wherein the first baseline compute performance level is based at least in part on a percentage utilization of a virtual processor.

18. The system of claim 17, wherein the virtual processor corresponds to at least one of a core of a processor of the host computer system or a hyper-thread of a processor of the host computer system.

19. The system of claim 14, wherein the service includes further instructions that upon execution cause the service to obtain, from the host computer system, an average utilization of a processor of the host computer system over a first period of time, and wherein the compute resource utilization of the host computer system is based at least in part on the average utilization.

20. The system of claim 14:

wherein a template comprising a plurality of slots is associated with the host computer system, each slot of the plurality of slots associated with a portion of a total compute capacity of the host computer system; and wherein the status identifier is associated with a slot of the plurality of slots.

* * * * *